(12) United States Patent
Ye et al.

(10) Patent No.: US 12,142,065 B2
(45) Date of Patent: Nov. 12, 2024

(54) DEVICE FOR ANALYZING CELL MORPHOLOGY, AND METHOD FOR IDENTIFYING CELLS

(71) Applicant: Shenzhen Mindray Bio-Medical Electronics Co., Ltd., Shenzhen (CN)

(72) Inventors: Bo Ye, Shenzhen (CN); Qiyao Wang, Shenzhen (CN); Yuan Xing, Shenzhen (CN); Huan Qi, Shenzhen (CN); Shan Yu, Shenzhen (CN); Qiaoni Chen, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 371 days.

(21) Appl. No.: 17/829,080

(22) Filed: May 31, 2022

(65) Prior Publication Data
US 2022/0327848 A1    Oct. 13, 2022

Related U.S. Application Data

(63) Continuation of application No. PCT/CN2019/122091, filed on Nov. 29, 2019.

(51) Int. Cl.
*G06V 20/69*    (2022.01)
*G01N 15/01*    (2024.01)
(Continued)

(52) U.S. Cl.
CPC .......... *G06V 20/698* (2022.01); *G01N 15/14* (2013.01); *G06T 7/73* (2017.01); *G06V 20/695* (2022.01);
(Continued)

(58) Field of Classification Search
CPC ............... G06V 20/698; G06V 20/695; G06V 2201/03; G06V 10/82; G01N 15/14;
(Continued)

(56) References Cited

U.S. PATENT DOCUMENTS

2004/0047033 A1    3/2004    Nakagawa

FOREIGN PATENT DOCUMENTS

| CN | 102359938 A | 2/2012 |
| CN | 202393695 U | 8/2012 |

(Continued)

OTHER PUBLICATIONS

CN105067520 Ding, machine translated (Year: 2015).*
CN105223110 He et al, machine translated (Year: 2016).*

*Primary Examiner* — Jianxun Yang
(74) *Attorney, Agent, or Firm* — Kory D. Christensen

(57) ABSTRACT

A device for analyzing cell morphology and a method for identifying cells are provided. A digital camera photographs a cell image of a blood sample under a low-magnification objective lens. A processor identifies and positions suspected cells of preset type in the cell image to obtain an identification result. Based on the identification result and a target number, the processor determines a number of suspected cells of preset type to be identified and positioned under the low-magnification objective lens. The digital camera further photographs, under a high-magnification objective lens, the suspected cells of preset type identified and positioned, and then the processor identifies whether the suspected cells of preset type photographed are cells of preset type, to count the number of cells of preset type photographed under the high-magnification objective lens and obtain a statistical value. If the statistical value≥the target number, photographing is stopped.

21 Claims, 9 Drawing Sheets

(51) Int. Cl.
*G01N 15/14* (2024.01)
*G06T 7/73* (2017.01)

(52) U.S. Cl.
CPC ..... *G01N 15/01* (2024.01); *G01N 2015/1486* (2013.01); *G06T 2207/30024* (2013.01); *G06T 2207/30242* (2013.01); *G06V 2201/03* (2022.01)

(58) Field of Classification Search
CPC .......... G01N 15/01; G01N 2015/1486; G01N 15/1433; G01N 2015/012; G01N 2015/016; G01N 2015/018; G01N 2015/0294; G01N 15/0227; G01N 15/1425; G01N 15/1429; G01N 2015/1006; G01N 2015/1497; G06T 7/73; G06T 2207/30024; G06T 2207/30242
See application file for complete search history.

(56) References Cited

FOREIGN PATENT DOCUMENTS

| | | |
|---|---|---|
| CN | 105067520 A | 11/2015 |
| CN | 105223110 A | 1/2016 |
| CN | 106769306 A | 5/2017 |

\* cited by examiner

Display Screen

DEVICE FOR ANALYZING CELL MORPHOLOGY, AND METHOD FOR IDENTIFYING CELLS

CROSS-REFERENCE TO RELATED APPLICATION

The present application is a continuation of International Application No. PCT/CN2019/122091, filed on Nov. 29, 2019, the contents of which are hereby incorporated by reference in its entirety.

BACKGROUND

Blood cell morphology analysis is mainly to analyze cell morphology in a blood sample, in order to classify cells in the blood sample and even identify abnormal cells in the blood sample. For example, a certain number of cells of preset type (e.g., white blood cells) in the blood sample may be analyzed through the blood cell morphology analysis.

A process of the blood cell morphology analysis may be described for example as follows. A cell image of the blood sample is photographed under a low-magnification objective lens in a device for analyzing cell morphology, cells in the cell image are identified and positioned, and after the number of identified and positioned cells exceeds a target number by a certain percentage (e.g., 1.5N, N represents the target number), the low-magnification objective lens is switched to a high-magnification objective lens for photographing.

However, there are some problems during implementing the analysis with the means of exceeding by a certain percentage. For a blood sample with many interfering cells, even if the number exceeds by a certain percentage, the number of the cells of preset type photographed under the high-magnification objective lens still cannot reach the target number, and thus clinical needs for the cells of preset type cannot be satisfied.

SUMMARY

The disclosure relates to medical device technologies, and in particular to a device for analyzing cell morphology, a method for identifying cells, and a storage medium.

Embodiments of the disclosure provide a device for analyzing cell morphology, a method for identifying cells, and a storage medium, to photograph at least a target number of cells of preset type under a high-magnification objective lens, thereby satisfying clinical needs for the cells of preset type.

The technical solutions of the embodiments of the disclosure are implemented in the following ways.

In one aspect, an embodiment of the disclosure provides a device for analyzing cell morphology. The device includes a digital imaging apparatus, a control apparatus, a processor, and an output apparatus. The digital imaging apparatus includes a low-magnification objective lens, a high-magnification objective lens, and a digital camera.

The digital camera is configured to photograph a cell image of a blood sample under the low-magnification objective lens.

The processor is configured to acquire a target number. The target number is the number of cells of preset type that are desired to be photographed under the high-magnification objective lens in the device for analyzing cell morphology. The processor identifies and positions suspected cells of preset type in the cell image to obtain an identification result. Based on the identification result and the target number, the processor determines a number of suspected cells of preset type to be identified and positioned under the low-magnification objective lens. After identifying and positioning the number of suspected cells of preset type to be identified and positioned under the low-magnification objective lens is completed, the processor instructs the digital camera to stop photographing under the low-magnification objective lens.

The control apparatus is configured to switch from the low-magnification objective lens to the high-magnification objective lens after the processor completes identifying and positioning the number of suspected cells of preset type to be identified and positioned under the low-magnification objective lens.

The digital camera is further configured to photograph, under the high-magnification objective lens, the suspected cells of preset type that are identified and positioned under the low-magnification objective lens.

The processor is further configured to identify whether the suspected cells of preset type photographed under the high-magnification objective lens are the cells of preset type, count the number of cells of preset type photographed under the high-magnification objective lens to obtain a statistical value, and instruct the digital camera to stop photographing under the high-magnification objective lens if the statistical value satisfies that the statistical value≥the target number.

The output apparatus is configured to output cell information of the suspected cells of preset type that are identified as the cells of preset type under the high-magnification objective lens.

In another aspect, an embodiment of the disclosure provides a method for identifying cells, applied to a device for analyzing cell morphology. The method includes:
acquiring a target number, wherein the target number is the number of cells of preset type that are desired to be photographed under a high-magnification objective lens by the device for analyzing cell morphology;
photographing a cell image of a blood sample under a low-magnification objective lens;
identifying and positioning suspected cells of preset type in the cell image to obtain an identification result, and based on the identification result and the target number, determining a number of suspected cells of preset type to be identified and positioned under the low-magnification objective lens;
after identifying and positioning the number of suspected cells of preset type to be identified and positioned under the low-magnification objective lens is completed, stopping photographing under the low-magnification objective lens;
switching from the low-magnification objective lens to the high-magnification objective lens;
photographing, under the high-magnification objective lens, the suspected cells of preset type that are identified and positioned under the low-magnification objective lens;
identifying whether the suspected cells of preset type photographed under the high-magnification objective lens are cells of preset type, and counting the number of cells of preset type photographed under the high-magnification objective lens to obtain a statistical value;
if the statistical value satisfies that the statistical value≥the target number, stopping photographing under the high-magnification objective lens; and
outputting cell information of the suspected cells of preset type that are identified as the cells of preset type under the high-magnification objective lens.

In yet another aspect, an embodiment of the disclosure provides a method for identifying cells, applied to a device for analyzing cell morphology. The method includes:

acquiring a target number, wherein the target number is the number of cells of preset type that are desired to be photographed under a high-magnification objective lens in the device for analyzing cell morphology;

acquiring a cell image of a blood sample photographed under a low-magnification objective lens;

identifying suspected cells of preset type in the cell image, and sequentially identifying and positioning the suspected cells of preset type;

obtaining information of all of the suspected cells of preset type being identified as cells of preset type at a current moment, to determine whether it is necessary to position and identify a next suspected cell of preset type;

if it is necessary to position and identify the next suspected cell of preset type, positioning and identifying the next suspected cell of preset type if it is not necessary to position and identify the next suspected cell of preset type, stopping photographing under the low-magnification objective lens;

switching from the low-magnification objective lens to the high-magnification objective lens;

acquiring suspected cells of preset type that are photographed under the high-magnification objective lens but identified and positioned under the low-magnification objective lens, identifying whether the suspected cells of preset type that are photographed under the high-magnification objective lens are the cells of preset type, and if the number of the cells of preset type reaches the target number, stopping photographing under the high-magnification objective lens; and outputting cell information of the suspected cells of preset type that are identified as the cells of preset type under the high-magnification objective lens.

In yet another aspect, an embodiment of the disclosure provides a device for analyzing cell morphology. The device for analyzing cell morphology includes a memory and a processor. The memory is configured to store executable instructions. The processor is configured to perform any method for identifying cells described in the above when running the executable instructions stored in the memory.

In yet another aspect, an embodiment of the disclosure provides a storage medium with stored executable instructions. The storage medium is configured to cause a processor to perform any method for identifying cells described in the above when executing the executable instructions.

In the embodiments of the disclosure, a device for analyzing cell morphology includes a digital imaging apparatus, a control apparatus, a processor, and an output apparatus. The digital imaging apparatus includes a low-magnification objective lens, a high-magnification objective lens, and a digital camera. The digital camera photographs a cell image of a blood sample under the low-magnification objective lens. The processor identifies and positions suspected cells of preset type in the cell image to obtain an identification result. Based on the identification result and a target number of cells of preset type that are desired to be photographed under the high-magnification objective lens, the processor determines a number of suspected cells of preset type to be identified and positioned under the low-magnification objective lens. After identifying and positioning the number of suspected cells of preset type to be identified and positioned under the low-magnification objective lens is completed, the digital camera photographs, under the high-magnification objective lens, the suspected cells of preset type identified and positioned. Then, the processor identifies whether the suspected cells of preset type photographed under the high-magnification objective lens are cells of preset type, so as to count the number of cells of preset type photographed under the high-magnification objective lens to obtain a statistical value. If the statistical value satisfies that the statistical value≥the target number, the processor instructs the digital camera to stop photographing under the high-magnification objective lens, such that the identifying of the suspected cells of preset type photographed under the high-magnification objective lens is finished. At the end, the processor identifies at least the target number of cells of preset type, which means that at least the target number of cells of preset type can be photographed under the high-magnification objective lens, regardless of the amount of the interfering cells in the blood sample, thereby satisfying clinical needs for the cells of preset type.

BRIEF DESCRIPTION OF THE DRAWINGS

To describe the technical solutions in the embodiments of the disclosure or the prior art more clearly, the accompanying drawings required for describing the embodiments or the prior art will be briefly introduced below. It is apparent that the accompanying drawings in the following description show some embodiments of the present disclosure, and a person of ordinary skill in the art may further derive other drawings from these accompanying drawings without creative efforts.

DETAILED DESCRIPTION

To make the objectives, technical solutions, and advantages of the disclosure clearer, the disclosure will be further described in detail with reference to the accompanying drawings. It is understood that the disclosure should not be limited by the embodiments set forth herein. Rather, the contents described in the embodiments of the disclosure are provided so that this disclosure will be comprehensively and fully described, and the concept of the disclosure will be conveyed to a person skilled in the art. All other embodiments obtained by a person skilled in the art without creative efforts shall fall within the scope of protection of the disclosure.

It is to be noted that in the embodiments of the disclosure, the terms "include", "comprise" or any other variations thereof mean a non-exclusive inclusion, such that a method or server including a series of elements not only includes the explicitly described elements, but also includes other elements which are not clearly listed, or further includes elements inherent to the implementation method or server. In the absence of more limitations, an element defined by the statement "including a/an . . . " does not exclude other related elements (such as, a step in a method or a unit in a server, for example, the unit may be part of a circuit, part of a processor, part of a program or software, etc.) present in the method or server including the element.

For example, the method for identifying cells provided in the embodiments of the disclosure includes a series of steps, but the method for identifying cells provided in the embodiments of the disclosure is not limited to the recited steps. Similarly, the device for analyzing cell morphology provided in the embodiments of the disclosure includes a series of apparatuses, but the device for analyzing cell morphology provided in the embodiments of the disclosure is not limited to the explicitly described apparatuses, and may further include apparatuses required for acquiring relevant information or performing processing based on the information. It is to be noted that in the following description, the term "an embodiment" represents subsets of all of possible embodiments. It may be understood that "an embodiment" may be the same subset or different subsets of all of the possible embodiments, and can be combined with each other without conflict.

Figure 1:
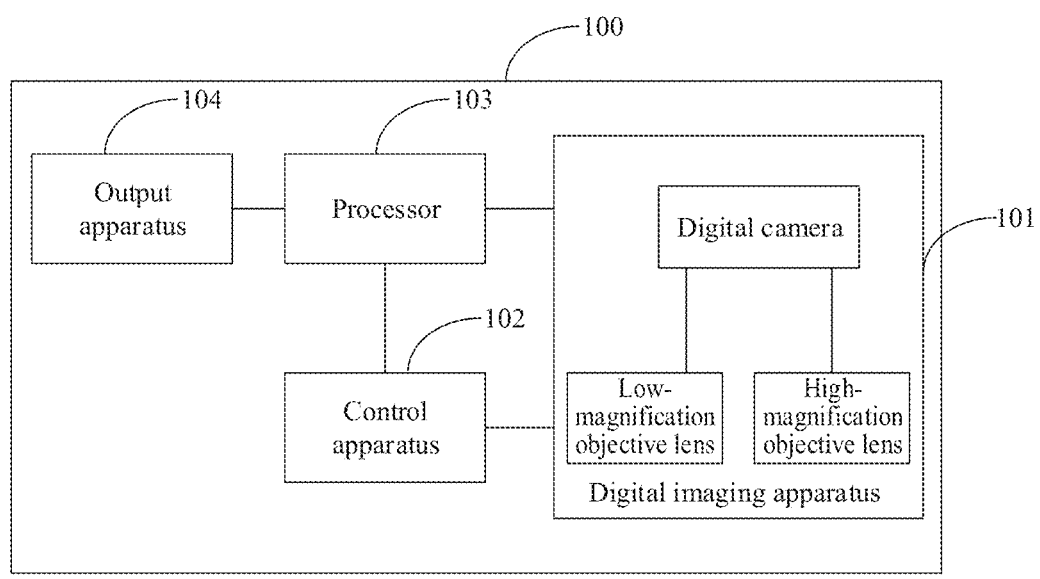
FIG. 1 is an optional schematic structural diagram of a device for analyzing cell morphology according to an embodiment of the disclosure.

FIG. 1 is an optional schematic structural diagram of a device for analyzing cell morphology according to an embodiment of the disclosure. The device for analyzing cell morphology 100 shown in FIG. 1 may include a digital imaging apparatus 101, a control apparatus 102, a processor 103, and an output apparatus 104. The digital imaging apparatus 101 includes a low-magnification objective lens, a high-magnification objective lens, and a digital camera.

The high-magnification objective lens and the low-magnification objective lens are two types of objective lenses in the device for analyzing cell morphology. High-magnification and low-magnification are relative, and the magnification of the high-magnification objective lens is greater than that of the low-magnification objective lens. When using the two types of objective lenses, the low-magnification objective lens is usually first used to identify and position cells, and then the high-magnification objective lens is used to photograph the identified and positioned cells, so as to continue to identify the cells under the high-magnification objective lens. Both the high-magnification objective lens and the low-magnification objective lens can magnify the blood sample. However, the magnifications of the high-magnification objective lens and the low-magnification objective lens are different, and the specific magnifications used depend on the objective lenses in the device for analyzing cell morphology, for example, the high-magnification objective lens may be a 100× objective lens, and the low-magnification objective lens may be a 10× objective lens.

Figure 2:
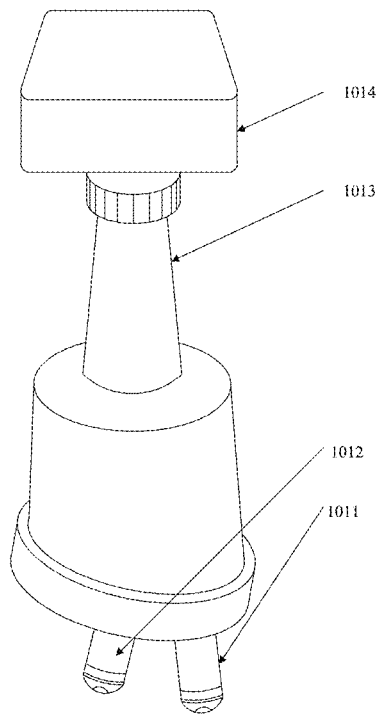
FIG. 2 is an optional schematic connection diagram of a digital imaging apparatus according to an embodiment of the disclosure.

When the blood sample is magnified by the high-magnification objective lens or the low-magnification objective lens, the digital camera is configured to photograph a cell image of the blood sample under the low-magnification objective lens, or is configured to photograph, under the high-magnification objective lens, especially the suspected cells of preset type that have been identified and positioned under the low-magnification objective lens. The schematic diagram of the connection relationship of the high-magnification objective lens, the low-magnification objective lens and the digital camera in the digital imaging apparatus is shown in FIG. 2. The high-magnification objective lens 1011 and the low-magnification objective lens 1012 are connected to the digital camera 1014 through an eyepiece 1013. The high-magnification objective lens 1011 or the low-magnification objective lens 1012 position cells in the blood sample, and the digital camera 1014 photographs, through the eyepiece 1013, the image positioned by the high-magnification objective lens 1011 or the low-magnification objective lens 1012, to realize the photographing under the high-magnification objective lens or the low-magnification objective lens. In this embodiment, the digital camera 1014 and the eyepiece 1013 may be replaced by an electronic eyepiece, and the photographing is achieved by means of an image acquisition function of the electronic eyepiece.

When the digital camera performs photographing under the low-magnification objective lens or the high-magnification objective lens, the digital camera can capture multiple images. The fields of view corresponding to the multiple images may be different so that the digital camera can capture more cell images under the low-magnification objective lens or the high-magnification objective lens. The control of the field of view during photographing under the low-magnification objective lens or the high-magnification objective lens can be realized by the control apparatus 102. A method of controlling the field of view is adjusting a relative positional relationship between the blood sample and the low-magnification objective lens or the high-magnification objective lens through the control apparatus 102. For example, the relative positional relationship may be adjusted by changing the position of at least one of the blood sample, the low-magnification objective lens or the high-magnification objective lens. Here, it is to be noted that different fields of view may be completely different fields of view or partially different fields of view. The completely different fields of view allow to quickly acquire more comprehensive and more cell images. Compared with the completely different fields of view, the partially different fields of view lead to a lower rate in acquiring more comprehensive and more cell images, but allow to acquire cell images of a same cell in different fields of view, so that the same cell can be identified and analyzed multiple times based on the cell images of the same cell in different fields of view, thereby improving the accuracy.

The processor 103 is configured to acquire a target number, identify and position suspected cells of preset type in the cell image photographed under the low-magnification objective lens to obtain an identification result. The processor is configured to determine a number of suspected cells of preset type to be identified and positioned under the low-magnification objective lens, based on the identification result and the target number. The processor is configured to instruct the digital camera to stop photographing under the low-magnification objective lens, after identifying and positioning the number of suspected cells of preset type to be identified and positioned under the low-magnification objective lens is completed. It is to be noted that the suspected cells of preset type in the cell image photographed under the low-magnification objective lens refer to cells that are considered to be nucleated cells under the low-magnification objective lens, but do not represent true nucleated cells. For example, under the low-magnification objective lens, white blood cells, nucleated red blood cells, smear cells, large/giant platelets, sediment, platelet aggregations and dust, etc., but not limited thereto, may be identified as the suspected cells of preset type.

The target number is the number of cells of preset type that are desired to be photographed under the high-magnification objective lens. The cells of preset type may include, but are not limited to, at least one type of cells selected from white blood cells, nucleated red blood cells, smear cells, large/giant platelets, sediment, platelet aggregations or dust. For example, the cells of preset type include at least one of nucleated red blood cells or white blood cells.

In a practical sample analysis process, the cells of preset type can be adjusted according to sample analysis requirements. If platelets are desired to be analyzed for the sample, the platelets are set as the cells of the preset type. In this embodiment, the setting and adjustment of the cells of preset type can be achieved by means of human-computer interaction instructions, and the cells of preset type to be specified currently may be carried in the human-computer interaction instructions. The human-computer interaction instructions include, but are not limited to, control instructions issued by an external control device, user voice instructions, user gesture instructions, and instructions directly inputted by a user on an interface of the device for analyzing cell morphology (such as the cells of preset type directly inputted by the user on the interface of the device for analyzing cell morphology), etc.

After determining the cells of preset type, the processor 103 needs to further determine the number (i.e., the target number) of the cells of preset type that are desired to be photographed under the high-magnification objective lens. For different cells of preset type, the corresponding target numbers thereto may be different. For example, for white blood cells and nucleated red blood cells, analysis of these two types of cells corresponds to different disease conditions, and thus it is necessary to set the respective target numbers for these two types of cells.

The setting and adjustment of the target numbers are similar to the setting and adjustment of the cells of preset type. The target numbers can also be set and adjusted by means of human-computer interaction instructions. The target number to be specified currently may be carried in the human-computer interaction instructions. For the forms of the human-computer interaction instructions, reference may be made to the above-mentioned description. Moreover, a human-computer interaction instruction can carry both the cells of preset type to be specified currently and the target number of the cells of preset type to be specified currently, such that the cells of preset type and the target number can be set in one time. The target number may also be set in other ways, for example, set before the device for analyzing cell morphology leaves the factory. In this way, the set cells of preset type and the corresponding target number can be directly used after the device for analyzing cell morphology leaves the factory.

It is described in the above that one of the functions of the target number is to define the number of the cells of preset type that are desired to be photographed under the high-magnification objective lens. Another function of the target number is to assist in obtaining the number of suspected cells of preset type to be identified and positioned under the low-magnification objective lens (i.e., the positioned number of suspected cells of preset type). For example, the process of determining the number of suspected cells of preset type to be identified and positioned under the low-magnification objective lens by the processor is: identifying and positioning suspected cells of preset type in the cell image photographed under the low-magnification objective lens to obtain an identification result, and based on the identification result and the target number, determining the number of suspected cells of preset type to be identified and positioned under the low-magnification objective lens.

The processor can identify and position the suspected cells of preset type in the cell image that are photographed under the low-magnification objective lens and acquire the target number simultaneously or sequentially. Moreover, the purpose of identifying and positioning is mainly to identify and position the suspected cells of preset type in the cell image, and particularly identify and position whether there are cells of preset type. The identification result obtained based on the identifying and positioning is mainly used for indicating whether there are cells of preset type among the suspected cells of preset type that are identified and positioned in the cell image, and further for indicating how many cells of preset type are identified and positioned if there are cells of preset type. For example, the identification result at least includes an estimated number. The estimated number is used for indicating the number of cells of preset type that are identified and positioned under the low-magnification objective lens. The forms of the estimated number include, but are not limited to the following.

A form of the estimated number is as follows. The estimated number may be the number of cells of preset type accumulatively identified at the current moment, that is, the estimated number is the sum of the number of the cells of preset type identified at the current moment and the number of the cells of preset type identified previously. Correspondingly, a method of determining the number of suspected cells of preset type to be identified and positioned under the low-magnification objective lens based on the identification result and the target number is: if the current estimated number is greater than or equal to the target number, the number of the suspected cells of preset type accumulatively identified currently is determined as the number of suspected cells of preset type to be identified and positioned under the low-magnification objective lens. For example, if the number of the suspected cells of preset type accumulatively identified currently is 260, the estimated number of the cells of preset type accumulatively identified currently is 200, and the target number is also 200, then it indicates that the number of the cells of preset type identified under the low-magnification objective lens at this time satisfies the requirement of the identification to be continued under the high-magnification objective lens. Then the number of suspected cells of preset type to be identified and positioned under the low-magnification objective lens may be 260. The number of suspected cells of preset type to be identified and positioned under the low-magnification objective lens is determined while the identifying and positioning the suspected cells of preset type is completed.

Another form of the estimated number is as follows. The estimated number is an estimated number of cells of preset type that are identified in a cell image photographed in at least one field of view under the low-magnification objective lens, and the estimated number is used as a reference number of the cells of preset type that are identified in the cell image photographed under the low-magnification objective lens to calculate the number of suspected cells of preset type to be identified and positioned under the low-magnification objective lens. For example, if 60 suspected cells of preset type are identified and positioned in the cell image, and there are 30 cells of preset type, it indicates that 30 cells of preset type can be identified from 60 suspected cells of preset type. If the target number is 100, the number of suspected cells of preset type to be identified and positioned under the low-magnification objective lens is 100*60/30. On this basis, when the estimated number is used as a reference number, the corresponding calculation formula of the number of suspected cells of preset type to be identified and positioned under the low-magnification objective lens is: the target number*N/the estimated number, where N represents the number of the suspected cells of preset type identified and positioned for obtaining the estimated number.

By determining the number of suspected cells of preset type to be identified and positioned under the low-magnification objective lens, the number of the cells of preset type that are identified and positioned under the low-magnification objective lens is allowed to meet the requirement of the target number, so that images of the target number of the cells of preset type can be photographed as much as possible under the high-magnification objective lens.

After determining the number of suspected cells of preset type to be identified and positioned under the low-magnification objective lens, the processor 103 controls the photographing under the low-magnification objective lens according to the number of suspected cells of preset type to be identified and positioned under the low-magnification objective lens. For example, after completing the identifying and positioning the number of suspected cells of preset type to be identified and positioned under the low-magnification objective lens, the processor instructs the digital camera to stop photographing under the low-magnification objective lens. Here, the control apparatus 102 can switch from the low-magnification objective lens to the high-magnification objective lens, so that the blood sample is switched from a field of view under the low-magnification objective lens to a field of view under the high-magnification objective lens, and continues to be photographed by the digital camera in the field of view under the high-magnification objective lens. Different from the photographing under the low-magnification objective lens, the digital camera photographs, under the high-magnification objective lens, the suspected cells of preset type that are identified and positioned under the low-magnification objective lens.

Figure 3:
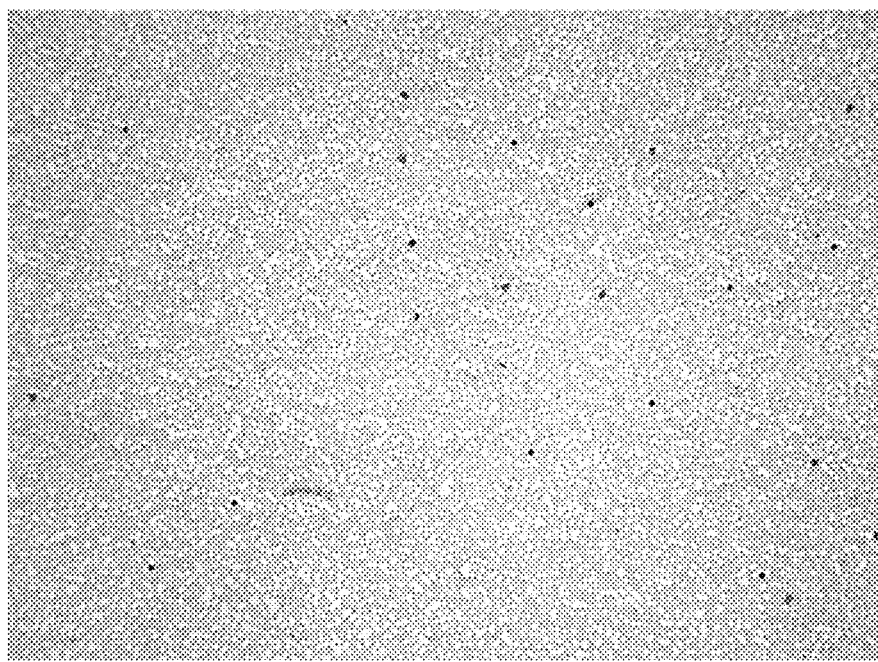
FIG. 3 is a schematic diagram of identifying and positioning under a low-magnification objective lens according to an embodiment of the disclosure.
Figure 4:
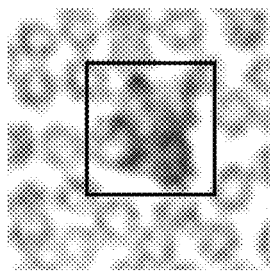
FIG. 4 and FIG. 5 are images of the identifying and positioning result shown in FIG. 3 photographed under a high-magnification objective lens.
Figure 5:
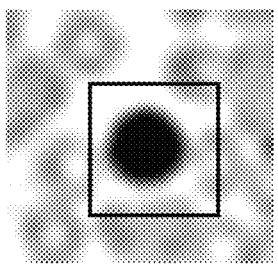

That is, the photographing under the low-magnification objective lens aims to identify and position the suspected cells of preset type from the blood sample, while the photographing under the high-magnification objective lens is for the suspected cells of preset type identified and positioned and aims to acquire images of the suspected cells of preset type by magnifying such suspected cells of preset type identified and positioned with a higher magnification. FIG. 3 shows the suspected cells of preset type in the cell image photographed under the low-magnification objective lens that are identified and positioned by the processor. The black dots in FIG. 3 represent the suspected cells of preset type identified and positioned. FIG. 4 and FIG. 5 are images of the suspected cells of preset type in FIG. 3 photographed under the high-magnification objective lens.

Correspondingly, the processor 103 is further configured to identify whether the suspected cells of preset type photographed under the high-magnification objective lens are cells of preset type, count the number of cells of preset type photographed under the high-magnification objective lens to obtain a statistical value, and if the statistical value satisfies that the statistical value≥the target number, instruct the digital camera to stop photographing under the high-magnification objective lens. It can be understood that the statistical value is generally less than or equal to the number of suspected cells of preset type to be identified and positioned under the low-magnification objective lens.

In this embodiment, it is possible that not all of the suspected cells of preset type identified and positioned by the processor 103 are the cells of preset type. For example, if the cells of preset type are white blood cells, the nucleated red blood cells identified and positioned are not the cells of preset type. Therefore, the processor 103 needs to further analyze the suspected cells of preset type photographed under the high-magnification objective lens, so as to determine whether the suspected cells of preset type are the cells of preset type. As for determining whether the suspected cells of preset type are the cells of preset type by the processor, reference may be made to existing methods for identifying cells such as white blood cells and nucleated red blood cells, which will not be described in this embodiment.

The statistical value is used for indicating the number of the cells of preset type identified under the high-magnification objective lens at the current moment, and the initial value of the statistical value may be 0. Once the processor identifies that the suspected cell of preset type is a cell of preset type, a previous statistical value will be updated. A method for updating may be: current statistical value=previous statistical value+the number of cells of preset type identified this time. If the statistical value obtained by the processor satisfies a preset condition, for example, the target number≤the statistical value, and further the target number≤the statistical value≤the number of suspected cells of preset type to be identified and positioned under the low-magnification objective lens, it means that the device for analyzing cell morphology has photographed at least the target number of cells of preset type. At this time, the processor can instruct the digital camera to stop photographing. Moreover, while instructing the digital camera to stop photographing, the processor needs to restore the statistical value to the initial value, so that the counting in the next identification of cells of preset type in the blood sample by the processor still starts from the initial value, thereby improving the counting accuracy.

The output apparatus 104 is configured to output cell information of the suspected cells of preset type that are identified as the cells of preset type under the high-magnification objective lens. The cell information of the suspected cells of preset type that are identified as the cells of preset type indicates that the suspected cells of preset type are the cells of preset type. For example, the cell information of the suspected cells of preset type that are identified as the cells of preset type includes images of the suspected cells of preset type that are identified as the cells of preset type, and particularly the images of the suspected cells of preset type under the high-magnification objective lens.

Figure 6:
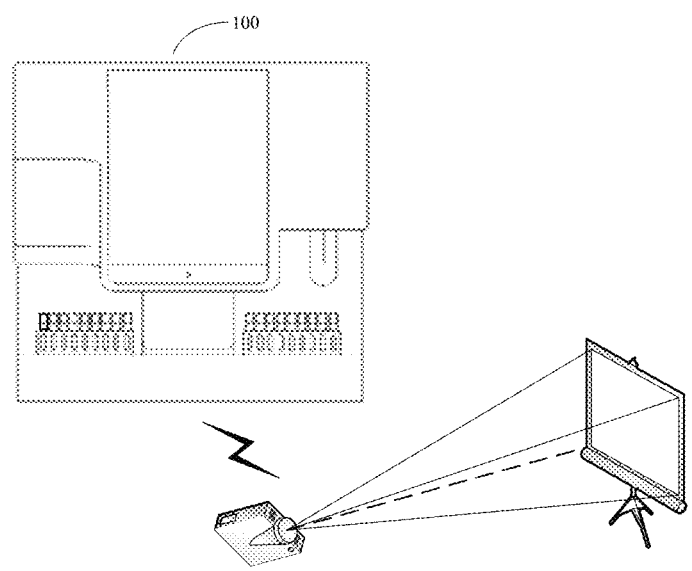
FIG. 6 is an optional schematic diagram showing the display of cell information according to an embodiment of the disclosure.

In this embodiment, a form of the output apparatus is as follows. The output apparatus may be an output interface (i.e., an electrical interface) configured to output a digital/analog signal, which can output a signal to an external display device (i.e., a display device separate from the device for analyzing cell morphology), for example, can output a signal to an external display screen or projector, so as to output the cell information of the suspected cells of preset type that are identified as the cells of preset type through the external display screen or projector. As shown in FIG. 6, the cell information is sent to the projector through the output apparatus, and the cell information is projected into a projection area through the projector. When the output apparatus is implemented as an output interface, depending on the application environment, the output interface may be configured to be connected to different display devices, for example, to be connected to at least two display screens so as to detect simultaneously by multiple people.

Figure 7:
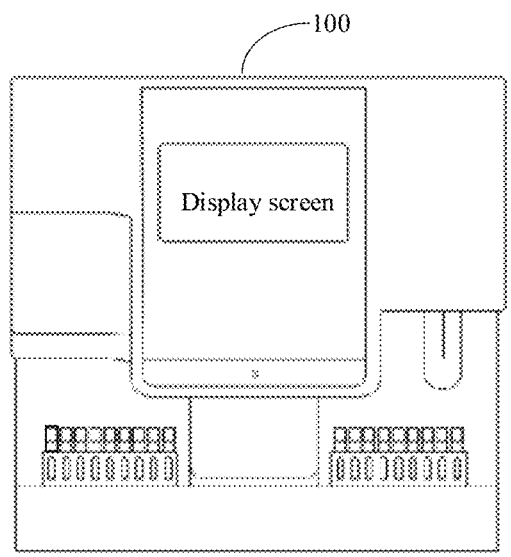
FIG. 7 is an optional schematic structural diagram of a device for analyzing cell morphology according to an embodiment of the disclosure.
Figure 8:
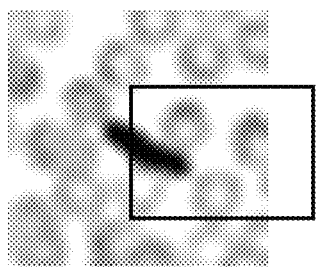
FIG. 8 to FIG. 11 show images of cells of different types photographed under a high-magnification objective lens according to an embodiment of the disclosure.
Figure 9:
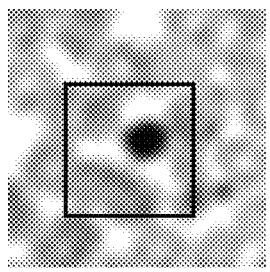
Figure 10:
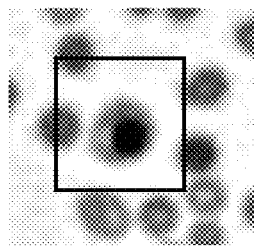
Figure 11:
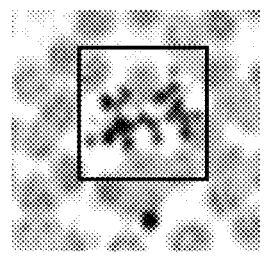

Another form of the output apparatus is as follows. The output apparatus may include an output interface and a display screen. The display screen is connected to the output interface and configured to receive a signal outputted by the output interface and correspondingly display the cell information. As shown in FIG. 7, the device for analyzing cell morphology includes a display screen, and the cell information is outputted through the output interface to the display screen for displaying. In addition, the output interface of the output apparatus can also transmit the cell information to an external display device, so that the cell information can also be displayed in the external display device while being displayed on the device for analyzing cell morphology. Therefore, the cell information can be displayed by different display devices simultaneously, so as to satisfy the viewing needs of different users. For example, the external display device may be a terminal located in a doctor's office. In this way, the doctor can view the cell information of the suspected cells of preset type that are identified as the cells of preset type, while the device for analyzing cell morphology is performing identification and analysis.

In the embodiments of the disclosure, a device for analyzing cell morphology includes a digital imaging apparatus, a control apparatus, a processor, and an output apparatus. The digital imaging apparatus includes a low-magnification objective lens, a high-magnification objective lens, and a digital camera. The digital camera photographs a cell image of a blood sample under the low-magnification objective lens. The processor identifies and positions suspected cells of preset type in the cell image to obtain an identification result. Based on the identification result and a target number of cells of preset type that are desired to be photographed under the high-magnification objective lens, the processor determines a number of suspected cells of preset type to be identified and positioned under the low-magnification objective lens. After identifying and positioning the number of suspected cells of preset type to be identified and positioned under the low-magnification objective lens is completed, the digital camera photographs under the high-magnification objective lens the suspected cells of preset type identified and positioned under the low-magnification objective lens. Then, the processor identifies whether the suspected cells of preset type photographed under the high-magnification objective lens are cells of preset type, so as to count the number of cells of preset type photographed under the high-magnification objective lens to obtain a statistical value. If the statistical value satisfies that the statistical value≥the target number, the processor instructs the digital camera to stop photographing under the high-magnification objective lens, such that the identifying of the suspected cells of preset type photographed under the high-magnification objective lens is finished. At the end, the processor identifies at least the target number of cells of preset type, which means that at least the target number of cells of preset type can be photographed under the high-magnification objective lens, regardless of the amount of the interfering cells in the blood sample, thereby satisfying clinical needs for the cells of preset type.

An existing device for analyzing cell morphology analysis may not photograph a target number of cells of preset type, especially when there are lots of suspected cell of preset type. In this case, the existing device for analyzing cell morphology would continue to perform photographing and identifying under a low-magnification objective lens, and then perform photographing under a high-magnification objective lens until the target number of cells of preset type would be photographed. Such a process would increase the time cost. The device for analyzing cell morphology in this embodiment can photograph at least the target number of cells of preset type under the high-magnification objective lens, regardless of the amount of the interfering cells in the blood sample, thereby reducing the time cost compared with the existing device for analyzing cell morphology.

Methods of determining the number of suspected cells of preset type to be identified and positioned under the low-magnification objective lens in this embodiment will be described below. The methods of determining the number of suspected cells of preset type to be identified and positioned under the low-magnification objective lens in this embodiment include, but are not limited to, the following methods.

A method of determining the number of suspected cells of preset type to be identified and positioned under the low-magnification objective lens is described as follows. Probability information $p_i$ of each of the suspected cells of preset type being a cell of preset type is obtained during identifying a cell image. The number of suspected cells of preset type to be identified and positioned under the low-magnification objective lens is calculated, according to the probability information $p_i$ of each of the suspected cells of preset type being a cell of preset type and the target number.

The probability information is used for characterizing a probability of a suspected cell of preset type being a cell of preset type. The probability information can be directly in the form of a probability value, for example, the probability information may be any value ranging in [0, 1]. For example, FIG. 4 shows a smear cell, the probability of which being a cell of preset type is 0.023. FIG. 5 shows a white blood cell, the probability of which being a cell of preset type is 0.997. FIG. 8 to FIG. 11 respectively show a sediment cell, a platelet, nucleated red blood cells, and platelet aggregations, the respective probabilities of which being the cells of preset type are 0.006, 0.012, 0.047, and 0.002. The processor calculates the number of suspected cells of preset type to be identified and positioned under the low-magnification objective lens according to these probability information and the target number.

An optional calculation method for the processor to calculate the number of suspected cells of preset type to be identified and positioned under the low-magnification objective lens according to the probability information $p_i$ of each of the suspected cells of preset type being a cell of preset type and the target number is as follows. An estimated number $$S = \sum_{i=1}^{N} p_i$$

of the cells of preset type is calculated according to the probability information $p_i$ of each of the suspected cells of preset type being a cell of preset type, with N representing the number of the suspected cells of preset type identified and positioned at the current moment. The number of suspected cells of preset type to be identified and positioned under the low-magnification objective lens is calculated based on the estimated number of the cells of preset type and the target number.

In this embodiment, N may be the number of suspected cells of preset type that are identified in the cell image photographed at the current moment. That is, the estimated number is calculated based on N obtained from one single cell image, and the number of cells of preset type identified in the one single cell image can be determined through a formula $$S = \sum_{i=1}^{N} p_i.$$

Correspondingly, an optional method of calculating the number of suspected cells of preset type to be identified and positioned under the low-magnification objective lens is the target number*N/the estimated number.

In this embodiment, N may be the number of suspected cells of preset type accumulatively identified and positioned at the current moment, i.e., the total number of suspected cells of preset type that are identified in the cell image photographed at the current moment and the cell image photographed previously, so as to determine the total number of cells of preset type accumulatively identified at the current moment. Correspondingly, an optional method of calculating the number of suspected cells of preset type to be identified and positioned under the low-magnification objective lens may be as follows.

The probability information of all of the suspected cells of preset type respectively being the cells of preset type obtained at the current moment is accumulated to obtain the estimated number $$S = \sum_{i=1}^{N} p_i$$

of the cells of preset type accumulated at the current moment. If the estimated number S≥λ*the target number is satisfied, the digital camera is instructed to stop photographing under the low-magnification objective lens. N at the current moment is the number of suspected cells of preset type to be identified and positioned under the low-magnification objective lens and λ is a constant. The purpose of providing λ is to prevent the situation that the detection result does not meet the clinical needs from happening, as the number of the cells of preset type actually obtained does not reach the target number although the estimated number S reaches the target number for some special samples. In this embodiment, the value of λ satisfies the following relational expression: 1≤λ≤1.25, then λ may be a value ranging in [1, 1.25], for example, λ=1, λ=1.15, λ=1.2, or λ=1.25. In clinical practice, if necessary, the value of λ may be increased. For example, the maximum value of λ may be 1.5, that is, λ may be a value ranging in [1, 1.5].

When the estimated number S≥λ*the target number, it indicates that the processor has accumulatively identified at least the target number of cells of preset type. Here, N used for calculating the estimated number can be determined as the number of suspected cells of preset type to be identified and positioned under the low-magnification objective lens. Therefore, the identifying and positioning the number of suspected cells of preset type to be identified and positioned under the low-magnification objective lens is completed while the number of suspected cells of preset type to be identified and positioned under the low-magnification objective lens is calculated.

During calculating the number of suspected cells of preset type to be identified and positioned under the low-magnification objective lens according to the estimated number of the cells of preset type accumulated at the current moment, there may be two cases. A first case is that the sum of the estimated number of the cells of preset type accumulated before switching the field of view and the estimated number of the cells of preset type in the cell image in the current field of view is less than λ*the target number. A second case is that the sum of the estimated number of the cells of preset type accumulated before switching the field of view and the estimated number of the cells of preset type in the cell image in the current field of view is greater than or equal to λ*the target number. The following optional processing methods can be adopted for processing in these two cases.

An optional processing method for the first case is as follows. If the sum of the estimated number of the cells of preset type accumulated before switching a field of view and the estimated number of the cells of preset type in the cell image in the current field of view is less than λ*the target number, the processor 103 updates the estimated number of the cells of preset type accumulated at the current moment, after the identifying and positioning the suspected cells of preset type in the cell image in the current field of view is completed, and instructs the control apparatus 102 to control the low-magnification objective lens to switch to a next field of view. The digital camera continues to photograph the blood sample in the next field of view under the low-magnification objective lens.

For example, if the sum of estimated numbers is 150, the target number is 200, λ ranges in [1, 1.25], and even λ may be extended to a range of [1, 1.5], the sum of the estimated numbers is less than the target number with such a range of λ, regardless of the specific value of λ. In this case, the processor updates the estimated number of the cells of preset type accumulated at the current moment to 150, and then the control apparatus controls the low-magnification objective lens to switch the field of view, so as to continue to acquire the cell image of the blood sample in the next field of view through the digital camera for identifying and positioning.

An optional processing method for the second case is as follows. The processor 103 calculates a difference between the estimated number before switching the field of view and λ*the target number, sequentially identifies and positions the suspected cells of preset type in the cell image in the current field of view to obtain the estimated number of the cells of preset type at the current moment in the current field of view. If the estimated number of the cells of preset type at the current moment in the current field of view is greater than or equal to the difference, the processor stops identifying and positioning, so as to stop identifying and positioning the remaining suspected cells of preset type after at least the target number of cells of preset type have been identified, thereby reducing time for identifying and positioning while satisfying the need of the target number of cells of preset type.

For example, if there are 190 cells of preset type that have been identified by the processor, and λ*the target number is 200, the difference between the estimated number before switching the field of view and λ*the target number is 10.

Each time when obtaining the probability information of one suspected cell of preset type being a cell of preset type, the processor calculates the estimated number of the cells of preset type at the current moment in the current field of view (it is noted that it is the estimated number at the current moment in the current field of view, rather than the estimated number accumulated). If the estimated number of the cells of preset type at the current moment in the current field of view is greater than or equal to the difference, identifying and positioning the remaining suspected cells of preset type are stopped. Here, it is to be noted that the estimated number of the cells of preset type at the current moment in the current field of view is the sum of the probability information of the suspected cells of preset type identified at the current moment in the current field of view, and the sum may have a fractional part. Therefore, when the estimated number of the cells of preset type at the current moment in the current field of view is less than but close to the difference, it is still necessary to continue to identify until the estimated number is greater than or equal to the difference.

Another optional processing method for the second case is as follows. The processor 103 identifies and positions all of the suspected cells of preset type in the cell image in the current field of view to obtain the estimated number of the cells of preset type accumulated at the current moment. The estimated number of the cells of preset type accumulated at the current moment is the sum of the estimated number of the cells of preset type accumulated before switching the field of view and the estimated number of the cells of preset type in the current field of view. If the estimated number of the cells of preset type accumulated at the current moment is greater than or equal to λ*the target number, the processor instructs the digital camera to stop photographing under the low-magnification objective lens, after all of the suspected cells of preset type in the cell image in the current field of view are positioned.

During the implementation of this optional processing method, each time when at least one suspected cell of preset type is identified and positioned, the estimated number of cells of preset type accumulated would be calculated. Even if the estimated number of the cells of preset type accumulated is greater than or equal to λ*the target number, identifying and positioning the remaining suspected cells of preset type would still be continued. In this case, although the time for identifying and positioning would be increased, the number of identified and positioned cells of preset type would be increased so as to ensure that at least the target number of cells of preset type can be photographed under the high-magnification objective lens. For example, if λ*the target number is 200 and the processor has accumulatively identified 201.02 cells of preset type, the processor would continue to identify and position the remaining suspected cells of preset type.

In this embodiment, another optional calculation method for the processor to calculate the number of suspected cells of preset type to be identified and positioned under the low-magnification objective lens according to the probability information $p_i$ of each of the suspected cells of preset type being a cell of preset type and the target number is as follows. The processor 103 obtains probability information $p_i$ of each of the suspected cells of preset type in the cell image in a first field of view being a cell of preset type, and calculates the number of suspected cells of preset type to be identified and positioned under the low-magnification objective lens according to the probability information $p_i$ of each of the suspected cells of preset type in the cell image in the first field of view being a cell of preset type and the target number.

The first field of view is a field of view under the low-magnification objective lens. The first field of view is not limited to the number one field of view photographed under the low-magnification objective lens. However, it is excluded as much as possible that the first field of view is the last field of view photographed under the low-magnification objective lens, as multiple cell images under the low-magnification objective lens need to be acquired previously with the last field of view as the basis and thus the processing efficiency would be reduced. In this embodiment, the first field of view may be any one field of view other than the last field of view photographed under the low-magnification objective lens. Alternatively, before implementing this embodiment, multiple different blood samples are analyzed to determine a reference field of view that can represent the cell distribution of the blood samples. Compared with the reference field of view, the suspected cells of preset type identified and positioned in other fields of view and the probability information of the suspected cells of preset type being the cells of preset type are similar. In this way, the difference between different fields of view can be ignored, and thus the reference field of view is used as the first field of view when implementing this embodiment.

An optional method for the processor 103 to calculate the number of suspected cells of preset type to be identified and positioned under the low-magnification objective lens according to the probability information in the first field of view and the target number is as follows. Probability information $p_i$ of each of the suspected cells of preset type obtained in the cell image in the first field of view being a cell of preset type is accumulated, to obtain the estimated number $$S = \sum_{i=1}^{N} p_i$$

of the cells of preset type in the first field of view, where N is the number of the suspected cells of preset type identified and positioned in the first field of view. The number of suspected cells of preset type to be identified and positioned under the low-magnification objective lens is equal to the target number*N/S.

For example, the number of the suspected cells of preset type that are identified and positioned under the first field of view is 4, and the estimated number is 2, it indicates that there are two cells of preset type from the four suspected cells of preset type. If the target number is 4, eight suspected cells of preset type are desired to be identified and positioned such that four cells of preset type can be identified. Therefore, it can be determined that the calculation formula of the number of suspected cells of preset type to be identified and positioned under the low-magnification objective lens is: the number of suspected cells of preset type to be identified and positioned under the low-magnification objective lens=the target number*N/S.

The above-mentioned optional calculation method describes the calculation of the number of suspected cells of preset type to be identified and positioned under the low-magnification objective lens based on the cell image of one field of view. In a practical implementation process, the number of suspected cells of preset type to be identified and positioned under the low-magnification objective lens can also be calculated based on the cell images of two or more fields of view. As an example, the cell images of two fields of view will be described below. The cell images of the two fields of view are cell images of two different fields of view. Correspondingly, the process of calculating the number of suspected cells of preset type to be identified and positioned under the low-magnification objective lens according to the probability information $p_i$ of each of the suspected cell of preset type being a cell of preset type and the target number by the processor is as follows.

The processor 103 obtains the probability information of each of the suspected cells of preset type in the cell image in the first field of view being a cell of preset type. The control apparatus 102 switches the field of view under the low-magnification objective lens, so that the processor 103 obtains the probability information of each of the suspected cells of preset type in the cell image in a second field of view being a cell of preset type.

The processor 103 calculates the number of suspected cells of preset type to be identified and positioned under the low-magnification objective lens based on the probability information of all of the suspected cells of preset type identified and positioned in the first field of view and the second field of view respectively being the cells of preset type and the target number.

The first field of view and the second field of view each are a field of view under the low-magnification objective lens. The first field of view and the second field of view are not limited to the number one field of view photographed under the low-magnification objective lens. However, it is excluded as much as possible that either of them is the last field of view photographed under the low-magnification objective lens, as multiple cell images under the low-magnification objective lens need to be acquired previously with the last field of view as the basis and thus the processing efficiency would be reduced. In this embodiment, the first field of view and the second field of view each may be any one field of view other than the last field of view photographed under the low-magnification objective lens. Alternatively, before implementing this embodiment, multiple different blood samples are analyzed to determine two reference fields of view that can represent the cell distribution of the blood samples. Compared with the two reference fields of view, the suspected cells of preset type identified and positioned in other fields of view and the probability information of the suspected cells of preset type being the cells of preset type are similar. In this way, the difference between different fields of view can be ignored, and thus the two reference fields of view are used as the first field of view and the second field of view when implementing this embodiment.

Alternatively, the first field of view and the second field of view are two adjacent fields of view when photographing under the low-magnification objective lens. However, the two adjacent fields of view are not necessarily the number one field of view and the number two field of view when photographing under the low-magnification objective lens. For example, according to the foregoing description of the first field of view, a field of view when photographing under the low-magnification objective lens is selected as the first field of view, and after the first field of view is determined, the next field of view to the first field of view is used as the second field of view. When the processor determines the number of suspected cells of preset type to be identified and positioned under the low-magnification objective lens according to the first field of view and the second field of view, the processor 103 may calculate the number of suspected cells of preset type to be identified and positioned under the low-magnification objective lens according to the probability information of each of the suspected cells of preset type in the cell image in the first field of view being a cell of preset type. If the number of suspected cells of preset type to be identified and positioned under the low-magnification objective lens calculated according to the first field of view does not reach (for example, less than) the target number, the processor 103 would continue to acquire the probability information of each of the suspected cells of preset type in the cell image in the second field of view being a cell of preset type, and recalculates the number of suspected cells of preset type to be identified and positioned under the low-magnification objective lens by combining the probability information of each of the suspected cells of preset type identified and positioned in the first field of view and the second field of view being a cell of preset type.

An optional method for the processor 103 to calculate the number of suspected cells of preset type to be identified and positioned under the low-magnification objective lens according to the probability information in the first field of view and the second field of view and the target number is as follows. The estimated number $$S = \sum_{i=1}^{N} p_i$$

of the cells of preset type at the current moment is calculated based on the probability information $p_i$ of all of the suspected cells of preset type identified and positioned in the first field of view and the second field of view respectively being the cells of preset type, where N represents the number of the suspected cells of preset type identified and positioned in the first field of view and the second field of view. Then, the number of suspected cells of preset type to be identified and positioned under the low-magnification objective lens is equal to the target number*N/S.

That is, an estimated number of the cells of preset type is obtained through the probability information of each of the suspected cells of preset type in the first field of view and the second field of view being a the cell of preset type, and then the number of suspected cells of preset type to be identified and positioned under the low-magnification objective lens is obtained according to the estimated number, the number of the suspected cells of preset type positioned for obtaining the estimated number, and the target number.

During obtaining the number of suspected cells of preset type to be identified and positioned under the low-magnification objective lens by the processor 103 according to the cell image in at least one field of view, there are two particular cases. A first particular case is that the sum of the number of the suspected cells of preset type before switching the field of view and the number of the suspected cells of preset type in the cell image in the current field of view is less than the number of suspected cells of preset type to be identified and positioned under the low-magnification objective lens. A second particular case is that the sum of the number of the suspected cells of preset type before switching the field of view and the number of the suspected cells of preset type in the cell image in the current field of view is greater than or equal to the number of suspected cells of preset type to be identified and positioned under the low-magnification objective lens. The following optional processing methods can be adopted for processing in these two particular cases.

An optional processing method for the first particular case is as follows. The processor 103 identifies and positions all of the suspected cells of preset type in the cell image in the current field of view to obtain the number of the suspected cells of preset type at the current moment. The number of the suspected cells of preset type at the current moment is the sum of the number of the suspected cells of preset type obtained before switching the field of view and the number of the suspected cells of preset type identified in the cell image in the current field of view. If the number of the suspected cells of preset type at the current moment is less than the number of suspected cells of preset type to be identified and positioned under the low-magnification objective lens, the processor 103 instructs the control apparatus to control the low-magnification objective lens to switch to the next field of view, after all of the suspected cells of preset type in the cell image in the current field of view are identified and positioned. The digital camera is further configured to continue to photograph the blood sample in the next field of view under the low-magnification objective lens.

For example, the number of the suspected cells of preset type at the current moment is 150, and the number of suspected cells of preset type to be identified and positioned under the low-magnification objective lens is 200. In this case, the number of the suspected cells of preset type at the current moment is less than the number of suspected cells of preset type to be identified and positioned under the low-magnification objective lens. It indicates that the processor has not completed the identifying of the number of suspected cells of preset type to be identified and positioned under the low-magnification objective lens. Then, the processor 103 instructs the control apparatus to control the low-magnification objective lens to switch the field of view, so as to continue to acquire the cell image of the blood sample in the next field of view through the digital camera for identifying and positioning.

An optional processing method for the second particular case is as follows. The processor 103 sequentially identifies and positions the suspected cells of preset type in the cell image in the current field of view to obtain the number of all of the suspected cells of preset type at the current moment (i.e., the number of all of the suspected cells of preset type accumulatively identified at the current moment). If the number of all of the suspected cells of preset type at the current moment reaches the number of suspected cells of preset type to be identified and positioned under the low-magnification objective lens, the processer stops identifying and positioning the remaining suspected cells of preset type in the cell image in the current field of view, and instructs the digital camera to stop photographing under the low-magnification objective lens. As such, identifying and positioning the remaining suspected cells of preset type is stopped after identifying and positioning at least the number of suspected cells of preset type to be identified and positioned under the low-magnification objective lens, thereby reducing the time for identifying and positioning while satisfying the need of the number of suspected cells of preset type to be identified and positioned under the low-magnification objective lens.

For example, the number of all of the suspected cells of preset type identified by the processor at the current moment is 220, and the number of suspected cells of preset type to be identified and positioned under the low-magnification objective lens is 200. It indicates that the processor has identified and positioned the number of suspected cells of preset type to be identified and positioned under the low-magnification objective lens. In this case, the processor stops identifying and positioning the remaining suspected cells of preset type.

Another optional processing method for the second particular case is as follows. The processor 103 identifies and positions the suspected cells of preset type in the cell image in the current field of view to obtain the number of all of the suspected cells of preset type at the current moment. If the number of all of the suspected cells of preset type at the current moment reaches the number of suspected cells of preset type to be identified and positioned under the low-magnification objective lens, the processor instructs the digital camera to stop photographing under the low-magnification objective lens after all of the suspected cells of preset type in the cell image in the current field of view are identified and positioned. That is, compared with the above-mentioned optional processing method for the second particular case, the difference is that: even if the number of all of the suspected cells of preset type at the current moment reaches the number of suspected cells of preset type to be identified and positioned under the low-magnification objective lens, all of the remaining suspected cells of preset type would still be identified and positioned. Through this processing method, although the time for identifying and positioning would be increased, the number of cells of preset type identified and positioned would be increased so as to ensure that at least the target number of cells of preset type can be photographed under the high-magnification objective lens.

For the above-mentioned three optional calculation methods of the number of suspected cells of preset type to be identified and positioned under the low-magnification objective lens, an optional method for the processor in this embodiment to obtain the probability information of each of the suspected cells of preset type being a cell of preset type is as follows. The processor 103 invokes a probability analysis model for identifying the cell image to obtain the probability information of each of the suspected cells of preset type being a cell of preset type.

For example, the probability analysis model is a deep neural network model obtained by training based on cell images of historical blood samples and whether suspected cells of preset type in the historical blood samples being cells of preset type. For example, the deep neural network model may be an AlexNet model. The probability analysis model is obtained by training an existing AlexNet model based on the cell images of the historical blood samples and whether the suspected cells of preset type in the historical blood samples being the cells of preset type. After the probability analysis model is obtained by training, the processor 103 inputs a currently photographed cell image of the blood sample into the probability analysis model, to obtain the probability information of each of the suspected cells of preset type being a cell of preset type outputted by the probability analysis model.

In this embodiment, a threshold may be provided in the probability analysis model. If the probability calculated by the probability analysis model is less than the threshold, the probability analysis model adjusts the probability less than the threshold to a constant value (such as 0) to be outputted. For the probabilities greater than or equal to the threshold, the probability analysis model outputs the actual calculation results of the probability analysis model. For example, the threshold may be, but is not limited to, 0.5. If the probability calculated by the probability analysis model is 0.1, the probability analysis model outputs 0. If the probability calculated by the probability analysis model is 0.6, the probability analysis model outputs 0.6. That is, the probability analysis model has a probability adjustment function. It adjusts the probability less than the threshold before outputting it. In this way, the effect of the probability less than the threshold on the estimated number can be reduced during the calculation of the estimated number, and improve the accuracy of the estimated number. It is likely that the suspected cells of preset type with a probability less than the threshold are not the cells of preset type, and such suspected cells of preset type can be automatically ignored by adjusting the probability thereof to be 0, thereby improving the accuracy of the estimated number.

Certainly, the probability analysis model can also be other deep neural network models, which will not be illustrated in this embodiment. However, it is to be noted that the cell images of the historical blood samples have the same pixels as the cell image of the blood sample currently photographed under the low-magnification objective lens. For example, the pixels of the cell image may be, but are not limited to 224*224.

In this embodiment, in addition to obtaining the probability information based on the probability analysis model, the processor 103 can obtain the probability information through other methods. For example, the processor 103 compares the cell image with a preset reference image to obtain the probability information of each of the suspected cells of preset type being a cell of preset type.

The preset reference image may be an image with a known proportion of cells of preset type. The proportion of the cells of preset type can be obtained by calculating an area occupied by the cells of preset type in the preset reference image. The proportion of the cells of preset type is defined as a ratio of the area to an area of the preset reference image. The proportion of the cells of preset type is regarded as the probability information of the cells of preset type in the preset reference image. Here, it is to be noted that the probability information of the cells of preset type in the preset reference image herein is the total probability information of the cells of preset type. For example, the preset reference image may be an image without any suspected cells of preset type, and correspondingly the probability information of the cells of preset type is approximately 0. Alternatively, the preset reference image is an image almost full of suspected cells of preset type, and the probability information of the cells of preset type is, for example, close to 100%.

After acquiring the cell image of the blood sample under the low-magnification objective lens, the area of suspected cells of preset type that are identified as the cells of preset type in the cell image is acquired by identifying at least one of color, cell size or the like in the cell image. The probability information of each of the suspected cells of preset type in the cell image at the current moment being a cell of preset type is obtained according to the area currently acquired, the area of the cells of preset type in the preset reference image, and the probability information of the cells of preset type in the preset reference image. For example, a ratio M of the area currently acquired to the area of the cells of preset type in the preset reference image is calculated. Then, the probability information of each of the suspected cells of preset type in the cell image at the current moment being a cell of preset type is equal to the product of the probability information of the cells of preset type in the preset reference image and M.

In this embodiment, another method for the processor 103 to determine the number of suspected cells of preset type to be identified and positioned under the low-magnification objective lens is as follows. The processor 103 sequentially positions and identifies the suspected cells of preset type in the cell image to identify whether the suspected cells of preset type are the cells of preset type. The processor counts the number of cells that are identified as the cells of preset type under the low-magnification objective lens. If the counted number of the cells that are identified as the cells of preset type under the low-magnification objective lens reaches the target number, the processor instructs the digital camera to stop photographing under the low-magnification objective lens. The number of the suspected cells of preset type having been identified and positioned when reaching the target number is considered as the number of suspected cells of preset type to be identified and positioned under the low-magnification objective lens.

That is, during identifying and positioning the suspected cells of preset type under the low-magnification objective lens, the processor 103 further identifies whether the suspected cells of preset type are cells of preset type. If the probability information of the suspected cell of preset type being a cell of preset type obtained by the processor 103 is greater than a preset threshold (for example, it may be, but is not limited to, 0.8), it indicates that the suspected cell of preset type is a cell of preset type, and one cell of preset type is positioned. When the target number of cells of preset type are identified and positioned, the number of the suspected cells of preset type identified and positioned is the number of suspected cells of preset type to be identified and positioned under the low-magnification objective lens, which means that the target number of cells of preset type have been identified from the number of suspected cells of preset type to be identified and positioned under the low-magnification objective lens.

Because of the limited range of the blood sample photographed in a field of view under the low-magnification objective lens, it is possible that the sum of the number of cells that are accumulatively identified as the cells of preset type in the previous field of view and the number of cells that are identified as the cells of preset type in the cell image in the current field of view is less than the target number during identifying and positioning by the processor 103. In this case, the processor 103 executes the following operations.

The processor 103 identifies and positions all of the suspected cells of preset type in the cell image in the current field of view to obtain the number of cells identified as the cells of preset type at the current moment. The number of the cells identified as the cells of preset type at the current moment is the sum of the number of cells identified as the cells of preset type before switching the field of view and the number of cells identified as the cells of preset type in the cell image in the current field of view. If the number of the cells identified as the cells of preset type at the current moment is less than the target number, the processor 103 instructs the control apparatus to control the low-magnification objective lens to switch to the next field of view, after all of the suspected cells of preset type in the cell image in the current field of view are positioned. The digital camera is further configured to continue to photograph the blood sample in the next field of view under the low-magnification objective lens.

That is, if the number of all of the cells of preset type accumulatively identified at the current moment is less than the target number, it is necessary to continue to photograph in a field of view under the low-magnification objective lens, so as to identify the target number of cells of preset type under the low-magnification objective lens. In this case, the control apparatus switches the field of view under the low-magnification objective lens, and the digital camera continues to photograph the blood sample in the next field of view under the low-magnification objective lens.

If the number of cells identified as the cells of preset type at the current moment is greater than the target number, the processor 103 can stop identifying the remaining suspected cells of preset type or continue to identify the remaining suspected cells of preset type. In this regard, limitation to the operation thereof will not be made in this embodiment.

Figure 12:
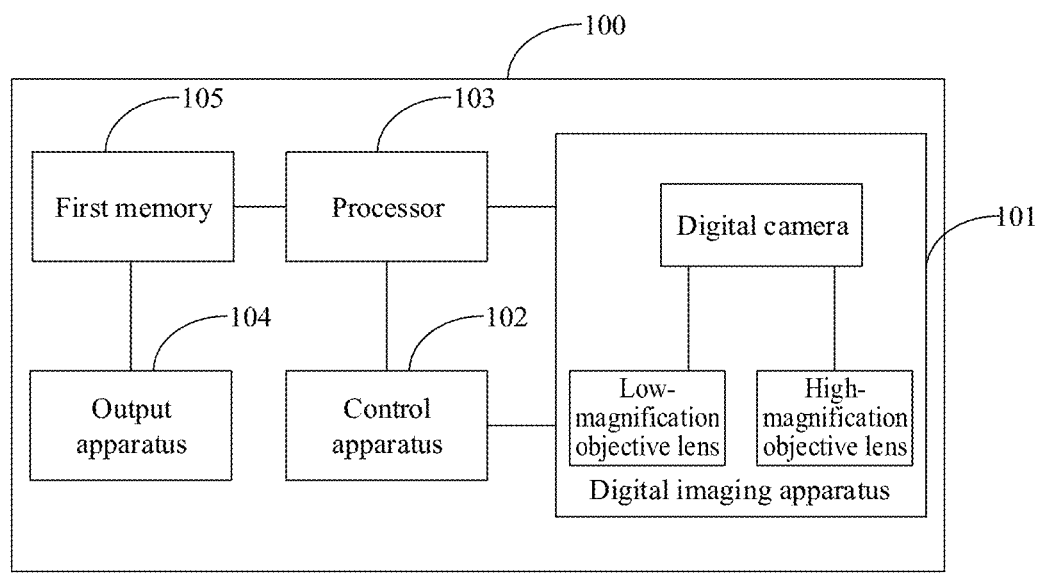
FIG. 12 is another optional schematic structural diagram of a device for analyzing cell morphology according to an embodiment of the disclosure.

For the above-mentioned device for analyzing cell morphology, yet another optional structure of the device for analyzing cell morphology may further include a first memory 105, as shown in FIG. 12. The first memory 105 is configured to store the cell image of the blood sample photographed under the low-magnification objective lens. The output apparatus 104 includes a first display screen. The first display screen is configured to display the cell image of the blood sample, such that the cell image of the blood sample may be viewed. A user can decide whether to retest the blood sample after viewing.

For the above-mentioned device for analyzing cell morphology, the device for analyzing cell morphology may further include a second memory. The second memory is configured to only store an image of suspected cells of preset type that are determined as the cells of preset type photographed under the high-magnification objective lens. Correspondingly, the output apparatus includes a second display screen. The second display screen is configured to display the image of the suspected cells of preset type that are determined as the cells of preset type photographed under the high-magnification objective lens, such that the suspected cells of preset type that are the cells of preset type can be viewed.

Figure 13:
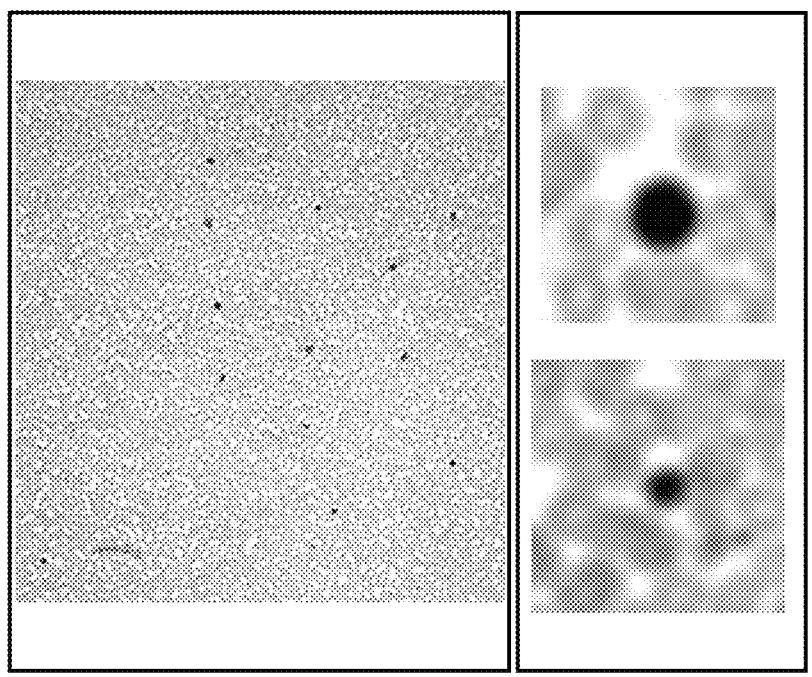
FIG. 13 is an optional schematic diagram of a displayed image of a device for analyzing cell morphology according to an embodiment of the disclosure.

The second memory and the first memory may be the same memory, or even two storage spaces of the same memory, or two independent memories, such that the device for analyzing cell morphology can simultaneously store the cell image of the blood sample photographed under the low-magnification objective lens and the image of the suspected cells of preset type that are determined as the cells of preset type photographed under high-magnification objective lens. Correspondingly, the first display screen and the second display screen may be two display areas of one display screen. The cell image of the blood sample and the image of a suspected cell of preset type determined as a cell of preset type are displayed simultaneously in a split-screen manner. In a display mode as shown in FIG. 13, the cell image of the blood sample is displayed, while an image of at least one suspected cell of preset type determined as a cell of preset type can also be displayed. Alternatively, the device for analyzing cell morphology can display the cell image of the blood sample and the image of the suspected cells of preset type determined as the cells of preset type through one display screen by time sharing. Alternatively, one of the first display screen and the second display screen is the display screen of the device for analyzing cell morphology, and the other is the display screen separate from the device for analyzing cell morphology. In this way, the cell image of the blood sample and the image of the suspected cells of preset type determined as the cells of preset type can also be displayed simultaneously.

Moreover, in the above-mentioned device for analyzing cell morphology, the digital camera can sequentially photograph the suspected cells of preset type identified and positioned under the high-magnification objective lens. Correspondingly, the processor identifies whether the suspected cells of preset type are the cells of preset type while the digital camera photographs the suspected cells of preset type. After the target number of cells of preset type are determined, the processor instructs the digital camera to stop photographing under the high-magnification objective lens, so that the photographing under the high-magnification objective lens and the identification of the cells of preset type can be performed simultaneously, thereby improving efficiency.

On this basis, the device for analyzing cell morphology may further include a third memory. The third memory is configured to store images of the cells of preset type and the suspected cells of preset type that are not the cells of preset type photographed under the high-magnification objective lens. The output apparatus includes a third display screen. The third display screen is configured to display the images of the cells of preset type and the suspected cells of preset type that are not the cells of preset type photographed under the high-magnification objective lens.

In this embodiment, the device for analyzing cell morphology may include at least two memories of the first memory, the second memory or the third memory. The at least two memories may be two storage spaces of the same memory, or two independent memories, such that the device for analyzing cell morphology can store different types of images simultaneously. Correspondingly, the output apparatus may include at least two of the first display screen, the second display screen or the third display screen. The at least two display screens may be two display areas of one display screen, such that different types of images can be displayed simultaneously in a split-screen manner. Alternatively, the device for analyzing cell morphology can display different types of images through one display screen by time sharing. Alternatively, one of the at least two display screens is a display screen of the device for analyzing cell morphology, and the other is a display screen separate from the device for analyzing cell morphology. In this way, different types of images can also be displayed simultaneously.

Figure 14:
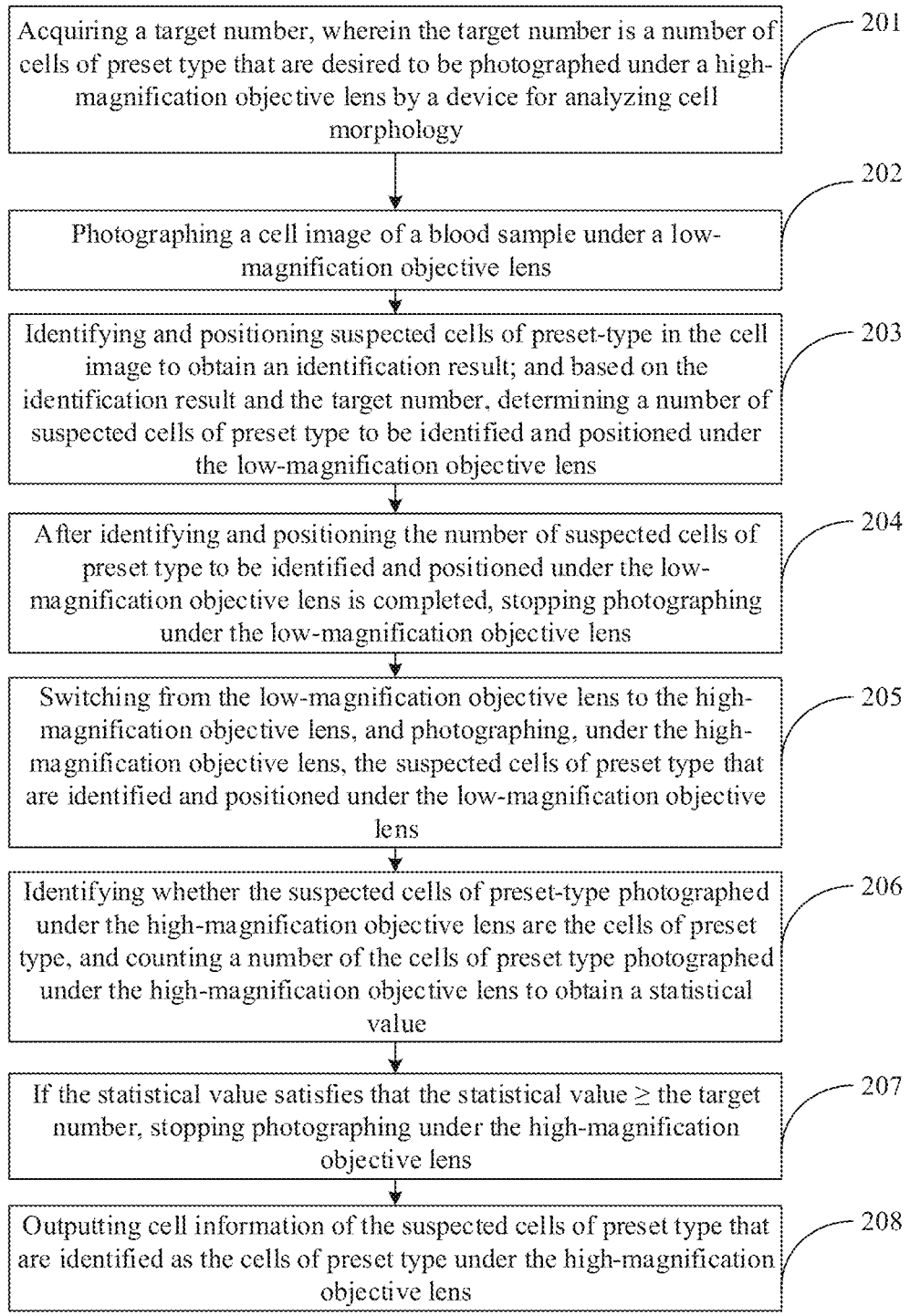
FIG. 14 is an optional flow chart of a method for identifying cells according to an embodiment of the disclosure.

Reference is made to FIG. 14, which is an optional flow chart of a method for identifying cells according to an embodiment of the disclosure. The method for identifying cells is applied to the above-mentioned device for analyzing cell morphology, and may include the following steps.

At 201, a target number is acquired. The target number is the number of cells of preset type that are desired to be photographed by the device for analyzing cell morphology under a high-magnification objective lens. For example, the suspected cells of preset type in the blood sample are cells with nuclei in the blood sample, including, but not limited to, white blood cells, nucleated red blood cells, smear cells, large/giant platelets, sediment, and platelets, etc. The cells of preset type are at least one type of cells selected from these suspected cells of preset type. For example, the cells of preset type include at least one of the nucleated red blood cells or the white blood cells. The cells of preset type and the target number of the cells of preset type can be adjusted through human-computer interaction instructions. Reference may be made to the relevant descriptions of the device in the foregoing embodiments for details, which will not be repeated in this embodiment.

At 202, a cell image of a blood sample under a low-magnification objective lens is photographed.

At 203, suspected cells of preset type in the cell image are identified and positioned to obtain an identification result, and based on the identification result and the target number, a number of suspected cells of preset type to be identified and positioned under the low-magnification objective lens is determined.

The identifying and positioning the suspected cells of preset type in the cell image photographed under the low-magnification objective lens and the acquiring the target number by the processor can be performed simultaneously or sequentially. The purpose of identifying and positioning is mainly to identify and position the suspected cells of preset type in the cell image, and particularly identify and position whether there are cells of preset type. The identification result obtained based on the identifying and positioning is mainly used for indicating whether there are cells of preset type among the suspected cells of preset type that are identified and positioned from the cell image, and further, if there are cells of preset type, for indicating how many cells of preset type are identified and positioned. For example, the identification result at least includes an estimated number. The estimated number is used for indicating the number of cells of preset type that are identified and positioned under the low-magnification objective lens. For the description of the estimated number, reference may be made to the device in the foregoing embodiments.

When photographing under the low-magnification objective lens, the field of view under the low-magnification objective lens covers a limited range of the blood sample. Thus, it is necessary to switch the field of view under the low-magnification objective lens when photographing under the low-magnification objective lens. Each time when a cell image of a blood sample is photographed, it is necessary to identify and position the cell image to determine the number of suspected cells of preset type to be identified and positioned under the low-magnification objective lens.

In this embodiment, a method of determining the number of suspected cells of preset type to be identified and positioned under the low-magnification objective lens is as follows. During identifying the cell image, probability information $p_i$ of each of the suspected cells of preset type being a cell of preset type is obtained. According to the probability information $p_i$ of each of the suspected cells of preset type being a cell of preset type and the target number, the number of suspected cells of preset type to be identified and positioned under the low-magnification objective lens is calculated. Optional calculation methods of the number of suspected cells of preset type to be identified and positioned under the low-magnification objective lens include, but are not limited to, the following methods.

An optional calculation method is as follows. An estimated number $$S = \sum_{i=1}^{N} p_i$$

of the cells of preset type is calculated according to the probability information $p_i$ of each of the suspected cells of preset type being a cell of preset type. The number of suspected cells of preset type to be identified and positioned under the low-magnification objective lens is calculated based on the estimated number of the cells of preset type and the target number. For example, the probability information of all of the suspected cells of preset type respectively being the cells of preset type obtained at the current moment is accumulated to obtain the estimated number $$S = \sum_{i=1}^{N} p_i$$

of the cells of preset type accumulated at the current moment. If the estimated number $S \geq \lambda *$the target number is satisfied, the photographing under the low-magnification objective lens is stopped, and N at the current moment is the number of suspected cells of preset type to be identified and positioned under the low-magnification objective lens, where $\lambda$ is a constant, and preferably, $1 \leq \lambda \leq 1.25$. The value of $\lambda$ can further be increased, for example, $1 \leq \lambda \leq 1.5$.

With this optical calculation method, the method for identifying cells provided in this embodiment may further include the following operations. If the sum of the estimated number of the cells of preset type accumulated before switching a field of view and the estimated number of the cells of preset type in the cell image in the current field of view is less than $\lambda *$the target number, the estimated number of the cells of preset type accumulated at the current moment is updated after identifying and positioning the suspected cells of preset type in the cell image in the current field of view is completed. Moreover, the low-magnification objective lens is controlled to switch to the next field of view so as to continue to photograph the blood sample in the next field of view under the low-magnification objective lens.

In addition or alternatively, the method for identifying cells provided in this embodiment may further include the following operations. A difference between the estimated number before switching the field of view and $\lambda *$the target number is calculated. The suspected cells of preset type in the cell image in the current field of view are sequentially identified and positioned to obtain the estimated number of the cells of preset type at the current moment in the current field of view. If the estimated number of the cells of preset type at the current moment in the current field of view is greater than or equal to the difference, identifying and positioning is stopped.

In addition or alternatively, the method for identifying cells in this embodiment may further include the following operations. All of the suspected cells of preset type in the cell image in the current field of view are identified and positioned to obtain the estimated number of the cells of preset type accumulated at the current moment. The estimated number of the cells of preset type accumulated at the current moment is the sum of the estimated number of the cells of preset type accumulated before switching the field of view and the estimated number of the cells of preset type in the current field of view. If the estimated number of the cells of preset type accumulated at the current moment is greater than or equal to $\lambda *$the target number, the photographing under the low-magnification objective lens is stopped after all of the suspected cells of preset type in the cell image in the current field of view are positioned.

Another optional calculation method is as follows. Probability information $p_i$ of each of the suspected cells of preset type in the cell image in a first field of view being a cell of preset type is obtained. The number of suspected cells of preset type to be identified and positioned under the low-magnification objective lens is calculated according to the probability information $p_i$ of each of the suspected cells of preset type in the cell image in the first field of view being a cell of preset type and the target number.

For example, the probability information $p_i$ of each of the suspected cells of preset type being a cell of preset type obtained in the cell image in the first field of view is accumulated, to obtain the estimated number $$S = \sum_{i=1}^{N} p_i$$

of the cells of preset type in the first field of view. N represents the number of the suspected cells of preset type identified and positioned in the first field of view. Then, the number of suspected cells of preset type to be identified and positioned under the low-magnification objective lens is equal to the target number*N/S.

Yet another optional calculation method is as follows. The probability information of each of the suspected cells of preset type in the cell image in the first field of view being a cell of preset type is obtained. The field of view is switched to obtain probability information of each of the suspected cells of preset type in the cell image in a second field of view being a cell of preset type. The number of suspected cells of preset type to be identified and positioned under the low-magnification objective lens is calculated based on the probability information of all of the suspected cells of preset type identified and positioned in the first field of view and the second field of view respectively being the cells of preset type and the target number.

For example, the estimated number $$S = \sum_{i=1}^{N} p_i$$

of the cells of preset type at the current moment is obtained based on the probability information $p_i$ of all of the suspected cells of preset type identified and positioned in the first field of view and the second field of view respectively being the cells of preset type. N represents the number of the suspected cells of preset type identified and positioned in the first field of view and the second field of view. Then, the number of suspected cells of preset type to be identified and positioned under the low-magnification objective lens is equal to the target number*N/S.

For the above-mentioned two methods of determining the number of suspected cells of preset type to be identified and positioned under the low-magnification objective lens based on the cell image in a field of view, the method for identifying cells provided in this embodiment may further include the following operations. All of the suspected cells of preset type in the cell image in the current field of view are identified and positioned to obtain the number of the suspected cells of preset type at the current moment. The number of the suspected cells of preset type at the current moment is the sum of the number of the suspected cells of preset type obtained before switching the field of view and the number of the suspected cells of preset type identified in the cell image in the current field of view. If the number of the suspected cells of preset type at the current moment is less than the number of suspected cells of preset type to be identified and positioned under the low-magnification objective lens, the low-magnification objective lens is controlled to switch to the next field of view after all of the suspected cells of preset type in the cell image in the current field of view are identified and positioned, so as to continue to photograph the blood sample in the next field of view under the low-magnification objective lens.

In addition or alternatively, the method for identifying cells provided in this embodiment may further includes the following operations. The suspected cells of preset type in the cell image in the current field of view are sequentially identified and positioned to obtain the number of all of the suspected cells of preset type at the current moment (i.e., the number of all of the suspected cells of preset type accumulatively identified at the current moment). If the number of all of the suspected cells of preset type at the current moment reaches the number of suspected cells of preset type to be identified and positioned under the low-magnification objective lens, the identifying and positioning the remaining suspected cells of preset type in the cell image in the current field of view is stopped, and the photographing under the low-magnification objective lens is stopped.

In addition or alternatively, the method for identifying cells provided in this embodiment may further includes the following operations. The suspected cells of preset type in the cell image in the current field of view are identified and positioned to obtain the number of all of the suspected cells of preset type at the current moment. If the number of all of the suspected cells of preset type at the current moment reaches the number of suspected cells of preset type to be identified and positioned under the low-magnification objective lens, the photographing under the low-magnification objective lens is stopped after all of the suspected cells of preset type in the cell image in the current field of view are identified and positioned.

A calculation method of the probability information of each of the suspected cells of preset type being a cell of preset type is invoking a probability analysis model for identifying the cell image to obtain the probability information of each of the suspected cells of preset type being a cell of preset type. The probability analysis model may be a deep neural network model. For example, the deep neural network model may be an AlexNet model. Pixels of the cell image may be, but are not limited to, **224*224**. Another method of calculating the probability information is comparing the cell image with a preset reference image to obtain the probability information of each of the suspected cells of preset type being a cell of preset type.

In this embodiment, another method of determining the number of suspected cells of preset type to be identified and positioned under the low-magnification objective lens is as follows. The suspected cells of preset type in the cell image are sequentially positioned and identified. It is identified whether the suspected cells of preset type are the cells of preset type, and the number of the cells of preset type identified under the low-magnification objective lens is counted. If the counted number of the cells of preset type identified under the low-magnification objective lens reaches the target number, the photographing under the low-magnification objective lens is stopped. The number of the suspected cells of preset type having been identified and positioned when reaching the target number is used as the number of suspected cells of preset type to be identified and positioned under the low-magnification objective lens.

Because of the limited range of the blood sample photographed in a field of view under the low-magnification objective lens, it is possible that the sum of the number of cells that are accumulatively identified as the cells of preset type in the previous field of view and the number of cells that are identified as the cells of preset type in the cell image in the current field of view is less than the target number during identifying and positioning. In this case, the method for identifying cells provided in this embodiment may further include the following steps.

All of the suspected cells of preset type in the cell image in the current field of view are identified and positioned to obtain the number of cells identified as the cells of preset type at the current moment. The number of the cells identified as the cells of preset type at the current moment is the sum of the number of cells identified as the cells of preset type before switching the field of view and the number of cells that are identified as the cells of preset type in the cell image in the current field of view. If the number of the cells identified as the cells of preset type at the current moment is less than the target number, the low-magnification objective lens is controlled to switch to the next field of view after all of the suspected cells of preset type in the cell image in the current field of view are positioned, to continue to photograph the blood sample in the next field of view under the low-magnification objective lens.

For a detailed description of the above-mentioned calculation methods of the number of suspected cells of preset type to be identified and positioned under the low-magnification objective lens, reference may be made to the device in the foregoing embodiments, which will not be repeated in this embodiment.

At 204, after identifying and positioning the number of suspected cells of preset type to be identified and positioned under the low-magnification objective lens is completed, the photographing under the low-magnification objective lens is stopped.

At 205, the low-magnification objective lens is switched to the high-magnification objective lens, and the suspected cells of preset type that are identified and positioned under the low-magnification objective lens are photographed under the high-magnification objective lens. Different from the photographing under the low-magnification objective lens, the digital camera photographs, under the high-magnification objective lens, the suspected cells of preset type that are identified and positioned under the low-magnification objective lens. That is, the photographing under the low-magnification objective lens aims to identify and position the suspected cells of preset type from the blood sample, while the photographing under the high-magnification objective lens is for the suspected cells of preset type identified and positioned under the low-magnification objective lens and aims to acquire images of the suspected cells of preset type by magnifying such suspected cells of preset type identified and positioned with a higher magnification.

At 206, whether the suspected cells of preset type photographed under the high-magnification objective lens are cells of preset type is identified, and the number of cells of preset type photographed under the high-magnification objective lens is counted to obtain a statistical value.

The statistical value is used for indicating the number of the cells of preset type identified under the high-magnification objective lens at the current moment. The initial value of the statistical value may be 0. Every time when the processor identifies that the suspected cells of preset type are cells of preset type, the previous statistical value is updated by the processor. The updating method is: current statistical value=previous statistical value+the number of cells of preset type identified this time.

At 207, if the statistical value satisfies that the statistical value≥the target number photographing under the high-magnification objective lens is stopped. If the statistical value satisfies that the statistical value≥the target number, it means that the device for analyzing cell morphology has photographed at least the target number of cells of preset type. At this time, the photographing can be stopped. Moreover, the statistical value is restored to the initial value while the photographing is stopped, so that the counting in the next identification of cells of preset type in the blood sample still starts from the initial value, thereby improving the counting accuracy. It can be understood that the statistical value is generally less than or equal to the number of suspected cells of preset type to be identified and positioned under the low-magnification objective lens. Furthermore, it can be used as a condition for stopping the photographing if the statistical value satisfies: the target number≤the statistical value≤the number of suspected cells of preset type to be identified and positioned under the low-magnification objective lens.

At 208, cell information of the suspected cells of preset type that are identified as the cells of preset type is outputted. The cell information of the suspected cells of preset type that are identified as the cells of preset type indicates that the suspected cells of preset type are the cells of preset type. For example, the cell information of the suspected cells of preset type that are identified as the cells of preset type includes images of the suspected cells of preset type that are the cells of preset type, and particularly the images of the suspected cells of preset type under the high-magnification objective lens. For the outputting method of the cell information, reference may be made to the device in the foregoing embodiments, which will not be repeated in this embodiment.

In addition, the method for identifying cells provided in this embodiment may include storing the cell image of the blood sample photographed under the low-magnification objective lens and displaying the cell image of the blood sample.

In addition or alternatively, only an image of suspected cells of preset type that are determined as the cells of preset type photographed under the high-magnification objective lens is stored, and the image of the suspected cells of preset type that are determined as the cells of preset type photographed under the high-magnification objective lens is displayed.

In addition or alternatively, the suspected cells of preset type identified and positioned are sequentially photographed under the high-magnification objective lens. It is identified whether the suspected cells of preset type are the cells of preset type while the suspected cells of preset type are photographed. Photographing under the high-magnification objective lens is stopped after the target number of cells of preset type is determined. In this way, the photographing under the high-magnification objective lens and the identifying of the cells of preset type can be performed simultaneously, thereby improving efficiency. On this basis, the method for identifying cells may further include storing images of the cells of preset type and suspected cells of preset type that are not the cells of preset type photographed under the high-magnification objective lens, and displaying the images of the cells of preset type and the suspected cells of preset type that are not the cells of preset type photographed under the high-magnification objective lens.

Figure 15:
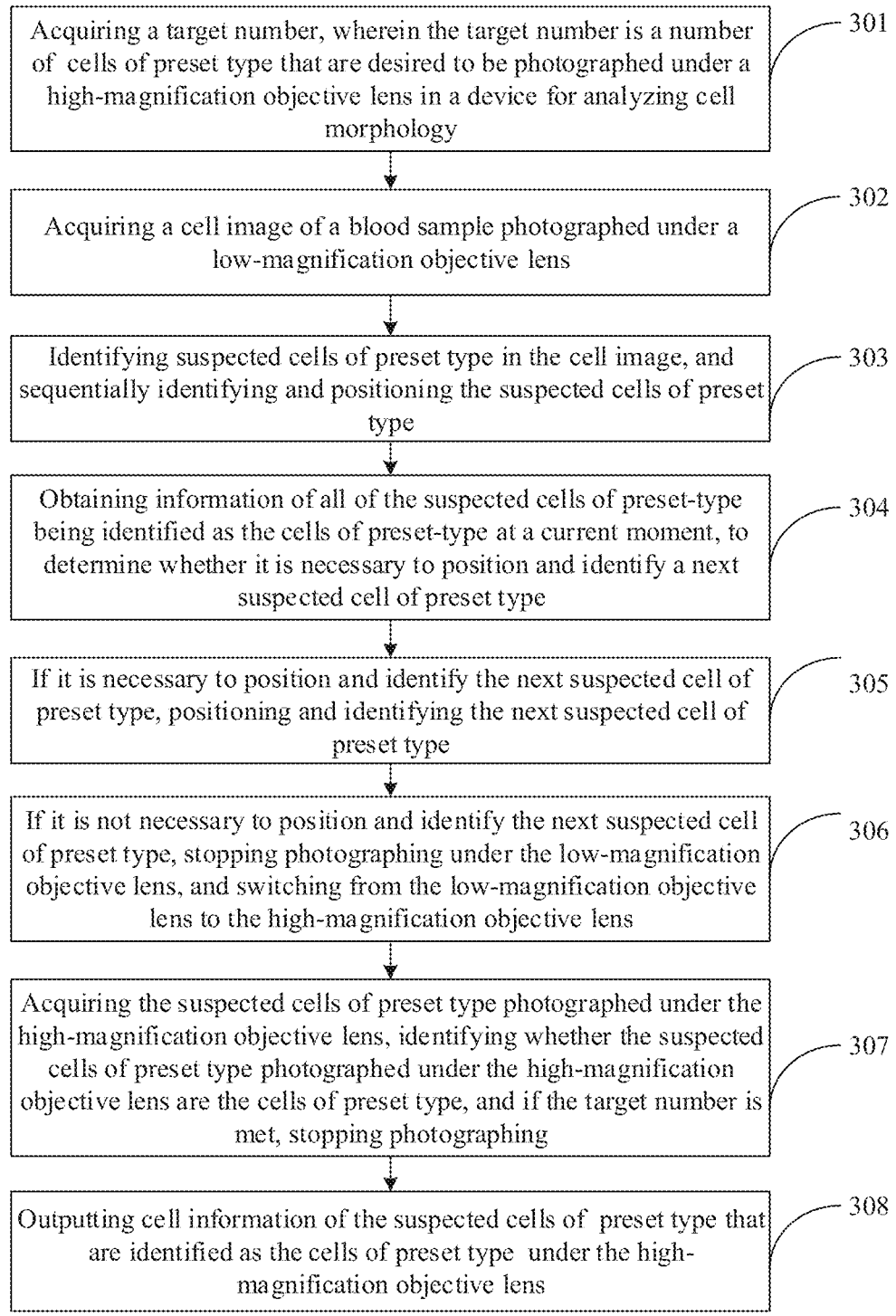
FIG. 15 is another optional flow chart of a method for identifying cells according to an embodiment of the disclosure.

Reference is made to FIG. 15, which is another optional flow chart of a method for identifying cells according to an embodiment of the disclosure. The method for identifying cells is also applied to the above-mentioned device for analyzing cell morphology, and may include the following steps.

At 301, a target number is acquired. The target number is the number of cells of preset type that are desired to be photographed under a high-magnification objective lens in the device for analyzing cell morphology.

At 302, a cell image of a blood sample photographed under a low-magnification objective lens is acquired.

At 303, suspected cells of preset type in the cell image are identified, and the suspected cells of preset type are sequentially positioned and identified.

At 304, information of all of the suspected cells of preset type being identified as cells of preset type at the current moment is obtained, to determine whether it is necessary to position and identify the next suspected cell of preset type.

At 305, if it is necessary to position and identify the next suspected cell of preset type, the next suspected cell of preset type is positioned and identified.

At 306, if it is not necessary to position and identify the next suspected cell of preset type, photographing under the low-magnification objective lens is stopped, and the low-magnification objective lens is switched to the high-magnification objective lens.

At 307, suspected cells of preset type identified and positioned under the low-magnification objective lens but photographed under the high-magnification objective lens are acquired. It is identified whether the suspected cells of preset type photographed under the high-magnification objective lens are the cells of preset type. If the number of the cells of preset type satisfies the target number, photographing under the high-magnification objective lens is stopped. For example, if the number of the cells of preset type is equal to the target number, or if the number of the cells of preset type is greater than the target number, the photographing under the high-magnification objective lens is stopped.

At 308, cell information of the suspected cells of preset type that are identified as the cells of preset type is outputted.

Different from the method for identifying cells shown in FIG. 14, the method for identifying cells shown in FIG. 15 is described from the aspect that the suspected cells of preset type are sequentially identified and positioned. In particular, after acquiring a cell image of a blood sample photographed under a low-magnification objective lens, the suspected cells of preset type in the cell image are sequentially identified and positioned to determine information of all of the suspected cells of preset type being identified as cells of preset type at the current moment. Based on the information, it is determined whether to identify and position the next suspected cell of preset type, for example, whether to identify and position the next suspected cell of preset type in the cell image currently acquired or whether to switch a field of view under the low-magnification objective lens, so as to acquire another cell image under the low-magnification objective lens and sequentially identify and position suspected cells of preset type in the other cell image. The information of all of the suspected cells of preset type being identified as the cells of preset type at the current moment can indicate the number of the cells of preset type identified at the current moment, such as the estimated number described in the above. Reference may be made to the relevant description of the device in the foregoing embodiments.

In this embodiment, an optional method of obtaining information of the cells of preset type to determine whether it is necessary to position and identify the next suspected cell of preset type is as follows.

Current suspected cells of preset type are positioned. Probability information of the current suspected cells of preset type being identified as the cells of preset type and probability information accumulated before identifying the current suspected cells of preset type are obtained. Accumulated probability information is updated according to the probability information of the current suspected cells of preset type being identified as the cells of preset type and the probability information accumulated before identifying the current suspected cells of preset type. According to the accumulated probability information, it is determined whether it is necessary to position the next suspected cell of preset type.

The probability information of the suspected cells of preset type being identified as the cells of preset type can characterize whether the suspected cells of preset type are the cells of preset type. The probability information can be obtained through the probability analysis model described in the above, but it is not limited to this. After obtaining the current probability information and the probability information accumulated before, the accumulated probability information can be updated by calculating the sum of the probability information. The accumulated probability information can indicate the number of cells of preset type that are accumulatively identified currently, such as the estimated number described in the above, so as to determine whether it is necessary to position the next suspected cell of preset type according to the estimated number. If the estimated number$\geq \lambda$*the target number, it indicates that it is not necessary to position the next suspected cell of preset type. Otherwise, it is necessary to position the next suspected cell of preset type.

In this embodiment, another optional method of obtaining the information of the cells of preset type to determine whether it is necessary to position and identify the next suspected cell of preset type is as follows. Current suspected cells of preset type are positioned. It is identified whether the current suspected cells of preset type are the cells of preset type. The number of suspected cells of preset type that are identified as the cells of preset type is updated, to determine whether it is necessary to position and identify the next suspected cell of preset type.

The purpose of positioning the current suspected cells of preset type is to identify whether the current suspected cells of preset type are the cells of preset type. If the probability information of the suspected cell of preset type being a cell of preset type is greater than a preset threshold (for example, it may be, but is not limited to, 0.8), it indicates that the suspected cell of preset type is a cell of preset type, and one cell of preset type is positioned. Then, the number of suspected cells of preset type that are identified as the cells of preset type (i.e., the number of the suspected cells of preset type) is updated. When the number of the suspected cells of preset type indicates that the target number of cells of preset type have been identified and positioned, the number of the suspected cells of preset type having been identified and positioned at this time is the number of suspected cells of preset type to be identified and positioned under the low-magnification objective lens. It indicates that the target number of cells of preset type has been identified from the number of suspected cells of preset type to be identified and positioned under the low-magnification objective lens, and the identifying and positioning the suspected cells of preset type can be stopped. Otherwise, it is necessary to identify and position the next suspected cell of preset type.

By means of the above-mentioned method for identifying cells, when the photographing under the high-magnification objective lens is finished, at least the target number of cells of preset type can be identified, which means that at least the target number of cells of preset type can be photographed under the high-magnification objective lens, regardless of the amount of the interfering cells in the blood sample, thereby satisfying clinical needs for the cells of preset type.

Figure 16:
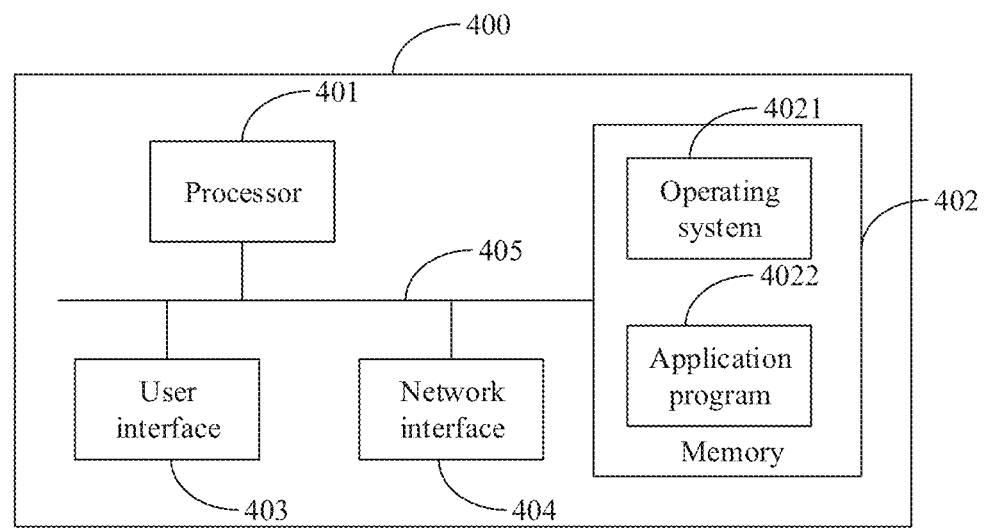
FIG. 16 is yet another optional schematic structural diagram of a device for analyzing cell morphology according to an embodiment of the disclosure.

Reference is made to FIG. 16, which is an optional schematic structural diagram of a device for analyzing cell morphology according to an embodiment of the disclosure. The device for analyzing cell morphology 400 shown in FIG. 16 may include a processor 401 and a memory 402, and may further include at least one network interface 403 and a user interface 404. Components in the device for analyzing cell morphology 400 are coupled together through a bus system 405. It may be understood that the bus system 405 is configured to connect the components for communication. In addition to a data bus, the bus system 405 further includes a power bus, a control bus, and a status signal bus. However, for ease of clear description, all types of buses are represented by the bus system 405 in FIG. 16.

The user interface 404 may include a display, a keyboard, a mouse, a trackball, a click wheel, a key, a button, a touchpad, or a touch screen.

It may be understood that the memory 402 may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disc, or a Compact Disc Read-Only Memory (CD-ROM). The magnetic surface memory may be a disk memory or a tape memory. The volatile memory may be a Random Access Memory (RAM), which is used as an external cache. By way of example without limitation, many forms RAM can be used, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 402 described in the embodiments of the disclosure intends to include these and any other suitable types of memories.

The memory 402 in embodiments of the disclosure includes, but is not limited to, a ternary content addressable memory and a static random access memory which can store various types of data such as cell images received to support the operation of the device for analyzing cell morphology 400. Examples of such data include any computer program executed on the device for analyzing cell morphology 400, such as an operating system 4021 and an application program 4022, stored images, a target number, a number of suspected cells of preset type to be identified and positioned under the low-magnification objective lens, and the like. The operating system 4021 includes various system programs, for example, a framework layer, a core library layer, a driver layer, and the like, which are used for implementing various basic services and a task based on hardware. The application program 4022 may include executable instructions, and when the executable instructions are executed, the above-mentioned method for identifying cells is performed.

The methods described in the foregoing embodiments of the disclosure may be implemented by the processor 401. The processor 401 may be an integrated circuit chip with signal processing capability. During implementation, each step of the above-mentioned methods can be completed by an integrated logic circuit of hardware or an operation in the form of software in the processor 401. The processor 401 may be a general purpose processor, a Digital Signal Processor (DSP), or other programmable logic devices, a discrete gate or transistor logical device, or discrete hardware components, or the like. The processor 401 can implement or execute the methods, steps, and logical block diagrams described in the embodiments of the disclosure. A general-purpose processor may be a microprocessor or any conventional processor or the like. The steps of the methods disclosed in the embodiments of the disclosure can be directly embodied as being executed by a hardware decoding processor, or executed by a combination of hardware and software modules in a decoding processor. The software module may be located in a storage medium, and the storage medium is located in the memory 402. The processor 401 reads the information in the memory 402, and completes the foregoing corresponding steps in combination with the hardware thereof.

In exemplary embodiments, the embodiments of the disclosure provide a storage medium, having executable instructions stored thereon, which is configured to cause a processor to implement the above-mentioned method for identifying cells when executing the executable instructions.

A person skilled in the art should understand that the embodiments of the disclosure can be provided as a method, a device, or a storage medium. Therefore, the embodiments of the disclosure may be embodied in the form of hardware embodiments, software embodiments, or embodiments combining software and hardware. Moreover, the embodiments of the disclosure may take the form of a computer program product executed on one or more computer-usable storage media (including a disk memory and an optical memory, etc.) containing computer-usable program codes.

The embodiments of the disclosure are described with reference to flowcharts and/or block diagrams of a method, a device (system), and a computer program product according to the embodiments of the disclosure. It is to be understood that each step and/or block in the flowchart and/or block diagram and the combination of steps and/or blocks in the flowchart and/or block diagram can be implemented by computer program operations. These computer program operations can be provided to a processor of a general-purpose computer, a special-purpose computer, an embedded processor, or other programmable data processing devices to produce a machine, so that an apparatus for implementing functions specified in one or more steps in the flowchart and/or one or more blocks in the block diagram can be produced by means of the operations executed by the processor of a computer or other programmable data processing devices.

These computer program operations can also be stored in a computer readable memory that can guide a computer or other programmable data processing devices to operate in a particular manner, such that the operations stored in the computer readable memory produce a product comprising an operation apparatus, and the operation apparatus implements the functions specified in one or more steps in the flowchart and/or one or more blocks in the block diagram.

These computer program operations can also be loaded on a computer or other programmable data processing devices to enable the computer or other programmable devices to execute a series of operation steps to perform computer-implemented processing, such that the operations executed on the computer or other programmable devices provide steps for achieving the functions specified in one or more steps in the flowchart and/or one or more blocks in the block diagram.

The foregoing descriptions are merely preferred embodiments of the disclosure, and are not intended to limit the scope of protection of the disclosure. Any modification, equivalent replacement, improvement and the like made within the spirit and principle of the disclosure shall fall within the scope of protection of the disclosure.

The invention claimed is:

1. A device for analyzing cell morphology, comprising: a digital imaging apparatus, a control apparatus, a processor, and an output apparatus, wherein the digital imaging apparatus comprises a low-magnification objective lens, a high-magnification objective lens, and a digital camera;

the digital camera is configured to photograph a cell image of a blood sample under the low-magnification objective lens;

the processor is configured to acquire a target number, wherein the target number is a number of cells of preset type that are desired to be photographed under the high-magnification objective lens in the device for analyzing cell morphology; the processor identifies and positions suspected cells of preset type in the cell image to obtain an identification result; based on the identification result and the target number, the processor determines a number of suspected cells of preset type to be identified and positioned under the low-magnification objective lens; and after identifying and positioning the number of suspected cells of preset type to be identified and positioned under the low-magnification objective lens is completed, the processor instructs the digital camera to stop photographing under the low-magnification objective lens;

the control apparatus is configured to switch from the low-magnification objective lens to the high-magnification objective lens after the processor completes identifying and positioning the number of suspected cells of preset type to be identified and positioned under the low-magnification objective lens;

the digital camera is further configured to photograph, under the high-magnification objective lens, the suspected cells of preset type that are identified and positioned under the low-magnification objective lens;

the processor is further configured to identify whether the suspected cells of preset type photographed under the high-magnification objective lens are the cells of preset type, count a number of the cells of preset type photographed under the high-magnification objective lens to obtain a statistical value, and instruct the digital camera to stop photographing under the high-magnification objective lens if the statistical value satisfies that the statistical value≥the target number; and the output apparatus is configured to output cell information of the suspected cells of preset type that are identified as the cells of preset type under the high-magnification objective lens.

2. The device of claim 1, wherein the processor is further configured to obtain probability information $p_i$ of each of the suspected cells of preset type in the cell image in a first field of view under the low-magnification objective lens being a cell of preset type, and calculate the number of suspected cells of preset type to be identified and positioned under the low-magnification objective lens according to the probability information $p_i$ of each of the suspected cells of preset type in the cell image in the first field of view being a cell of preset type and the target number.

3. The device of claim 2, wherein the processor is further configured to accumulate the probability information $p_i$ of each of the suspected cells of preset type being a cell of preset type obtained from the cell image in the first field of view under the low-magnification objective lens, and estimate a number $$S = \sum_{i=1}^{N} p_i$$

of the cells of preset type in the first field of view, wherein N represents a number of suspected cells of preset type identified and positioned in the first field of view under the low-magnification objective lens; and the number of suspected cells of preset type to be identified and positioned under the low-magnification objective lens is equal to the target number*N/S.

4. The device of claim 3, wherein the processor is further configured to identify and position all of the suspected cells of preset type in the cell image in a current field of view under the low-magnification objective lens to obtain a number of suspected cells of preset type at a current moment, wherein the number of suspected cells of preset type at the current moment is a sum of a number of suspected cells of preset type obtained before switching to the current field of view and a number of suspected cells of preset type identified and positioned in the cell image in the current field of view; if the number of suspected cells of preset type at the current moment is greater than or equal to the number of suspected cells of preset type to be identified and positioned under the low-magnification objective lens, the processor instructs the digital camera to stop photographing under the low-magnification objective lens after all of the suspected cells of preset type in the cell image in the current field of view are identified and positioned; and if the number of suspected cells of preset type at the current moment is less than the number of suspected cells of preset type to be identified and positioned under the low-magnification objective lens, the processor instructs the control apparatus to control the low-magnification objective lens to switch to a next field of view after all of the suspected cells of preset type in the cell image in the current field of view are identified and positioned; and the digital camera is further configured to continue to photograph the blood sample in the next field of view under the low-magnification objective lens.

5. The device of claim 3, wherein the processor is further configured to sequentially identify and position the suspected cells of preset type in the cell image in a current field of view to obtain a number of all of the suspected cells of preset type at a current moment, and if the number of all of the suspected cells of preset type at the current moment is greater than or equal to the number of suspected cells of preset type to be identified and positioned under the low-magnification objective lens, stop identifying and positioning remaining suspected cells of preset type in the cell image in the current field of view, and instruct the digital camera to stop photographing under the low-magnification objective lens.

6. The device of claim 1, wherein the processor is further configured to obtain probability information of each of the suspected cells of preset type in the cell image in a first field of view under the low-magnification objective lens being a cell of preset type;

the control apparatus is further configured to switch a field of view under the low-magnification objective lens, so that the processor obtains probability information of each of the suspected cells of preset type in the cell image in a second field of view under the low-magnification objective lens being a cell of preset type; and the processor is further configured to calculate the number of suspected cells of preset type to be identified and positioned under the low-magnification objective lens based on the probability information $p_i$ of all of the suspected cells of preset type identified and positioned in the first field of view and the second field of view respectively being the cells of preset type and the target number.

7. The device of claim 6, wherein the processor is further configured to estimate a number $$S = \sum_{i=1}^{N} p_i$$

of the cells of preset type at a current moment based on the probability information $p_i$ of all of the suspected cells of preset type identified and positioned in the first field of view and the second field of view respectively being the cells of preset type, wherein N represents a number of suspected cells of preset type identified and positioned in the first field of view and the second field of view under the low-magnification objective lens; and the number of suspected cells of preset type to be identified and positioned under the low-magnification objective lens is equal to the target number*N/S.

8. A device for analyzing cell morphology, comprising: a digital imaging apparatus, a control apparatus, a processor, and an output apparatus, wherein the digital imaging apparatus comprises a low-magnification objective lens, a high-magnification objective lens, and a digital camera;

the digital camera is configured to photograph a cell image of a blood sample under the low-magnification objective lens;

the processor is configured to acquire a target number, wherein the target number is a number of cells of preset type that are desired to be photographed under the high-magnification objective lens in the device for analyzing cell morphology; the processor identifies and positions suspected cells of preset type in the cell image to obtain an identification result, the identification result comprises a number of cells of preset type identified from the suspected cells of preset type in the cell image;

the processor is further configured to instruct the digital camera to stop photographing under the low-magnification objective lens, based on the identification result and the target number;

the control apparatus is configured to switch from the low-magnification objective lens to the high-magnification objective lens;

the digital camera is further configured to photograph, under the high-magnification objective lens, the suspected cells of preset type that are identified and positioned under the low-magnification objective lens;

the processor is further configured to identify whether the suspected cells of preset type photographed under the high-magnification objective lens are the cells of preset type, count a number of the cells of preset type photographed under the high-magnification objective lens to obtain a statistical value, and instruct the digital camera to stop photographing under the high-magnification objective lens if the statistical value satisfies that the statistical value≥the target number; and the output apparatus is configured to output cell information of the suspected cells of preset type that are identified as the cells of preset type under the high-magnification objective lens.

9. The device of claim 8, wherein the processor is further configured to obtain probability information $p_i$ of each of the suspected cells of preset type being a cell of preset type during identifying the cell image, and determine the number of the cells of preset type identified from the suspected cells of preset type in the cell image according to the probability information $p_i$ of each of the suspected cells of preset type being a cell of preset type.

10. The device of claim 9, wherein the processor is further configured to estimate a number $$S = \sum_{i=1}^{N} p_i$$

of the cells of preset type according to the probability information $p_i$ of each of the suspected cells of preset type being a cell of preset type, with N representing a number of suspected cells of preset type identified and positioned under the low-magnification objective lens, and wherein the number S is the number of the cells of preset type identified from the suspected cells of preset type in the cell image.

11. The device of claim 10, wherein the processor is further configured to accumulate probability information of all of the suspected cells of preset type respectively being the cells of preset type obtained at a current moment to estimate the number $$S = \sum_{i=1}^{N} p_i$$

of the cells of preset type accumulated at the current moment, and instruct the digital camera to stop photographing under the low-magnification objective lens if the number S≥λ*the target number is satisfied, wherein λ is a constant, and 1≤λ≤1.25.

12. The device of claim 11, wherein the processor is further configured to calculate a difference between an estimated number of the cells of preset type before switching to a current field of view and λ*the target number, sequentially identify and position the suspected cells of preset type in the cell image in the current field of view to obtain an estimated number of the cells of preset type at the current moment in the current field of view, and if the estimated number of the cells of preset type at the current moment in the current field of view is greater than or equal to the difference, stop identifying and positioning.

13. The device of claim 11, wherein the processor is further configured to identify and position all of the suspected cells of preset type in the cell image in a current field of view under the low-magnification objective lens to estimate a number of the cells of preset type accumulated at the current moment, wherein the estimated number of the cells of preset type accumulated at the current moment is a sum of an estimated number of the cells of preset type accumulated before switching to the current field of view and an estimated number of the cells of preset type in the current field of view; and if the estimated number of the cells of preset type accumulated at the current moment is greater than or equal to λ*the target number, the processor instructs the digital camera to stop photographing under the low-magnification objective lens; if the estimated number of the cells of preset type accumulated at the current moment is less than λ*the target number, the processor updates the estimated number of the cells of preset type accumulated at the current moment after identifying and positioning the suspected cells of preset type in the cell image in the current field of view is completed, and instructs the control apparatus to control the low-magnification objective lens to switch to a next field of view; and the digital camera is further configured to continue to photograph the blood sample in the next field of view under the low-magnification objective lens.

14. The device of claim 8, wherein the processor is further configured to invoke a probability analysis model for identifying the cell image to obtain probability information of each of the suspected cells of preset type being a cell of preset type, and the probability analysis model is a deep neural network model;

or wherein the processor is further configured to compare the cell image with a preset reference image to obtain the probability information of each of the suspected cells of preset type being a cell of preset type.

15. The device of claim 8, wherein the processor is further configured to sequentially position and identify the suspected cells of preset type in the cell image to determine the number of the cells of preset type identified from the suspected cells of preset type in the cell image by identifying whether the suspected cells of preset type are the cells of preset type, and instruct the digital camera to stop photographing under the low-magnification objective lens if the number of the cells of preset type reaches the target number.

16. The device of claim 15, wherein the processor is further configured to identify and position all of the suspected cells of preset type in the cell image in a current field of view to obtain a number of cells identified as the cells of preset type at a current moment, wherein the number of the cells identified as the cells of preset type at the current moment is a sum of a number of cells identified as the cells of preset type before switching to the current field of view and a number of cells in the cell image in the current field of view that are identified as the cells of preset type; and if the number of the cells identified as the cells of preset type at the current moment is less than the target number, the processor instructs the control apparatus to control the low-magnification objective lens to switch to a next field of view after all of the suspected cells of preset type in the cell image in the current field of view are identified and positioned; and the digital camera is further configured to continue to photograph the blood sample in the next field of view under the low-magnification objective lens.

17. The device of claim 8, further comprising:

a memory, configured to store images of the cells of preset type and the suspected cells of preset type that are not the cells of preset type photographed under the high-magnification objective lens, wherein the output apparatus comprises a display screen, which is configured to display the images of the cells of preset type and the suspected cells of preset type that are not the cells of preset type photographed under the high-magnification objective lens.

18. The device of claim 8, wherein the cells of preset type are at least one of white blood cells or nucleated red blood cells.

19. A method for identifying cells, applied to a device for analyzing cell morphology, comprising:

acquiring a target number, wherein the target number is a number of cells of preset type that are desired to be photographed under a high-magnification objective lens by the device for analyzing cell morphology;

photographing a cell image of a blood sample under a low-magnification objective lens;

identifying and positioning suspected cells of preset type in the cell image to obtain an identification result; and based on the identification result and the target number, determining a number of suspected cells of preset type to be identified and positioned under the low-magnification objective lens;

stopping photographing under the low-magnification objective lens, after identifying and positioning the number of suspected cells of preset type to be identified and positioned under the low-magnification objective lens is completed;

switching from the low-magnification objective lens to the high-magnification objective lens;

photographing, under the high-magnification objective lens, the suspected cells of preset type that are identified and positioned under the low-magnification objective lens;

identifying whether the suspected cells of preset type photographed under the high-magnification objective lens are the cells of preset type; and counting a number of the cells of preset type photographed under the high-magnification objective lens to obtain a statistical value;

if the statistical value satisfies that the statistical value≥the target number, stopping photographing under the high-magnification objective lens; and outputting cell information of the suspected cells of preset type that are identified as the cells of preset type under the high-magnification objective lens.

20. The method of claim 19, wherein the method comprises:

obtaining probability information $p_i$ of each of the suspected cells of preset type in the cell image in a first field of view under the low-magnification objective lens being a cell of preset type; and calculating the number of suspected cells of preset type to be identified and positioned under the low-magnification objective lens according to the probability information $p_i$ of each of the suspected cells of preset type in the cell image in the first field of view being a cell of preset type and the target number;

or the method comprises:

obtaining probability information of each of the suspected cells of preset type in the cell image in a first field of view under the low-magnification objective lens being a cell of preset type;

switching a field of view to obtain probability information of each of the suspected cells of preset type in the cell image in a second field of view under the low-magnification objective lens being a cell of preset type; and calculating the number of suspected cells of preset type to be identified and positioned under the low-magnification objective lens based on the probability information $p_i$ of all of the suspected cells of preset type identified and positioned in the first field of view and the second field of view respectively being the cells of preset type and the target number.

21. The method of claim 20, wherein the method comprises:

accumulating the probability information $p_i$ of each of the suspected cells of preset type obtained in the cell image in the first field of view being a cell of preset type, to estimate a number $$S = \sum_{i=1}^{N} p_i$$

of the cells of preset type in the first field of view, wherein N represents a number of suspected cells of preset type identified and positioned in the first field of view under the low-magnification objective lens; wherein the number of suspected cells of preset type to be identified and positioned under the low-magnification objective lens is equal to the target number*N/S;

or wherein the method comprises:

estimating a number $$S = \sum_{i=1}^{N} p_i$$

of the cells of preset type at a current moment based on the probability information $p_i$ of all of the suspected cells of preset type identified and positioned in the first field of view and the second field of view respectively being the cells of preset type, wherein N represents a number of suspected cells of preset type identified and positioned in the first field of view and the second field of view under the low-magnification objective lens; and the number of suspected cells of preset type to be identified and positioned under the low-magnification objective lens is equal to the target number*N/S.

\* \* \* \* \*